US011910955B2

(12) United States Patent
McVey et al.

(10) Patent No.: US 11,910,955 B2
(45) Date of Patent: Feb. 27, 2024

(54) CASES FOR PORTABLE GRILLS

(71) Applicant: Weber-Stephen Products LLC, Palatine, IL (US)

(72) Inventors: Cassandra A. S. McVey, Palatine, IL (US); Romualdo Sonny Siazon, Woodstock, IL (US); Shannon Ella Cerny, Elgin, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 759 days.

(21) Appl. No.: 17/038,881

(22) Filed: Sep. 30, 2020

(65) Prior Publication Data
US 2022/0095835 A1  Mar. 31, 2022

(51) Int. Cl.
*A47J 37/07*  (2006.01)
(52) U.S. Cl.
CPC .................... *A47J 37/0786* (2013.01)
(58) Field of Classification Search
CPC .................................................. A47J 37/0786
USPC ........................................................ 150/165
See application file for complete search history.

(56) References Cited

U.S. PATENT DOCUMENTS

| 2,058,836 | A | * | 10/1936 | Silver | F24B 1/205 |
| | | | | | 126/30 |
| D119,513 | S | | 3/1940 | Wolff | |
| 2,254,578 | A | * | 9/1941 | O'Brien | A45C 7/0077 |
| | | | | | 190/107 |
| D137,638 | S | | 4/1944 | Spiro, Jr. | |
| 3,777,862 | A | * | 12/1973 | Zipper | A45C 3/004 |
| | | | | | 190/107 |
| D300,524 | S | | 4/1989 | Reynolds et al. | |
| D301,025 | S | | 5/1989 | Reynolds et al. | |
| 4,877,281 | A | | 10/1989 | Altmann | |

(Continued)

FOREIGN PATENT DOCUMENTS

| EP | 3056113 | 8/2016 |
| GB | 2476661 | 7/2011 |
| GB | 2476730 | 7/2011 |

OTHER PUBLICATIONS

Char-Broil: (https://www.amazon.com/Char-Broil-Grill2Go-Carry-All-Case/dp/B00E0HOYD8) (Year: 2014).*

(Continued)

*Primary Examiner* — John K Fristoe, Jr.
*Assistant Examiner* — Justin Caudill
(74) *Attorney, Agent, or Firm* — Hanley, Flight & Zimmerman

(57) ABSTRACT

Cases for portable grills are disclosed. An example case includes a base, a first flap extending from the base, a second flap extending from the base, a third flap extending from the base, and a fourth flap extending from the base. The base is centrally located relative to the first, second, third, and fourth flaps. The case is configured to be positioned in an open configuration in which the first flap extends radially away from the base in a first direction, the second flap extends radially away from the base in a second direction that differs from the first direction, the third flap extends radially away from the base in a third direction that differs from the first and second directions, and the fourth flap extends radially away from the base in a fourth direction that differs from the first, second, and third directions.

20 Claims, 21 Drawing Sheets

(56) References Cited

U.S. PATENT DOCUMENTS

| | | | |
|---|---|---|---|
| D308,036 S | 5/1990 | Queen et al. | |
| 5,110,171 A | 5/1992 | Anthony | |
| D341,252 S | 11/1993 | Ryan | |
| D344,481 S | 2/1994 | Ryan | |
| D345,050 S | 3/1994 | Ryan | |
| D377,472 S | 1/1997 | Perry | |
| 5,737,880 A | 4/1998 | Hayes et al. | |
| D412,151 S | 7/1999 | Ferrigan | |
| 5,927,785 A | 7/1999 | Cantrell | |
| 6,058,658 A | 5/2000 | Dunn | |
| 6,120,078 A | 9/2000 | Smyl | |
| 6,131,560 A * | 10/2000 | Healy | A47J 37/0763 126/30 |
| 6,149,040 A | 11/2000 | Walker | |
| 6,290,278 B1 | 9/2001 | Loveland | |
| 6,439,221 B1 | 8/2002 | Ward et al. | |
| 6,517,141 B1 * | 2/2003 | Su | B60J 11/00 150/166 |
| 6,536,489 B1 | 3/2003 | Rowan et al. | |
| D481,887 S | 11/2003 | Ellwanger | |
| 6,845,875 B2 | 1/2005 | Grattan | |
| D502,360 S | 3/2005 | Kautz | |
| 6,863,100 B2 | 3/2005 | Neal et al. | |
| D563,105 S | 3/2008 | Rothschild | |
| D582,676 S | 12/2008 | Rothschild | |
| 7,488,024 B1 | 2/2009 | Medlar | |
| 7,597,209 B2 | 10/2009 | Rothschild et al. | |
| 7,597,373 B2 | 10/2009 | McAuliffe, Jr. | |
| D612,315 S | 3/2010 | Narazaki | |
| 7,798,549 B2 | 9/2010 | Dilley et al. | |
| 7,845,508 B2 | 12/2010 | Rothschild et al. | |
| D652,667 S | 1/2012 | Schwartz | |
| 8,128,146 B2 | 3/2012 | Sogame et al. | |
| 8,348,324 B2 | 1/2013 | Worden | |
| 8,444,198 B2 | 5/2013 | Pauken | |
| D691,833 S | 10/2013 | Wagner | |
| D696,877 S | 1/2014 | Cameron | |
| 8,714,389 B2 | 5/2014 | Rothschild et al. | |
| 9,321,402 B2 | 4/2016 | Nedelman | |
| 9,468,337 B2 | 10/2016 | Simon et al. | |
| 9,480,317 B2 | 11/2016 | Rothschild et al. | |
| 9,596,958 B1 | 3/2017 | Murphy | |
| 9,630,562 B2 | 4/2017 | Nedelman | |
| 9,694,837 B2 * | 7/2017 | Ryan | B62B 3/022 |
| 9,756,967 B2 | 9/2017 | Lehovetzki et al. | |
| D798,796 S | 10/2017 | Yang | |
| D813,776 S | 3/2018 | Jaimes | |
| D819,368 S | 6/2018 | Zemel et al. | |
| 10,092,074 B2 | 10/2018 | Rothschild et al. | |
| D838,478 S * | 1/2019 | Dean | D3/273 |
| D854,356 S | 7/2019 | Dolfi | |
| 10,349,763 B2 | 7/2019 | Floyd-Vester et al. | |
| D858,144 S | 9/2019 | Fu | |
| 10,421,406 B2 | 9/2019 | Bergdahl | |
| D884,390 S | 5/2020 | Wang | |
| D888,465 S | 6/2020 | Weng et al. | |
| D907,404 S | 1/2021 | Whelley McCabe | |
| D919,335 S | 5/2021 | Wang | |
| D938,195 S | 12/2021 | Christmas et al. | |
| 2002/0076521 A1 | 6/2002 | Doppelt | |
| 2004/0026946 A1 * | 2/2004 | Reed, III | B60P 3/0257 296/24.3 |
| 2006/0207697 A1 * | 9/2006 | Greiner | A45C 7/0095 150/113 |
| 2007/0283946 A1 | 12/2007 | Maruzzo et al. | |
| 2009/0101256 A1 | 4/2009 | Maruzzo | |
| 2009/0173648 A1 * | 7/2009 | Geneva | A45C 11/008 206/349 |
| 2009/0236019 A1 | 9/2009 | Maruzzo | |
| 2013/0319903 A1 | 12/2013 | Floyd-Vester et al. | |
| 2014/0224701 A1 | 8/2014 | Floyd-Vester et al. | |
| 2018/0014614 A1 * | 1/2018 | Marshall | A45C 7/0095 |
| 2018/0359990 A1 * | 12/2018 | Graham | A01K 1/029 |
| 2019/0142154 A1 | 5/2019 | Lin | |
| 2020/0077817 A1 | 3/2020 | Floyd-Vester et al. | |

OTHER PUBLICATIONS

United States Patent and Trademark Office, "Ex Parte Quayle Action," issued in connection with U.S. Appl. No. 29/753,367, dated Jul. 22, 2022, 4 pages.

"Weber Traveler Cargo Protector Grill Cover," sold on amazon.com, dated Aug. 20, 2021, retrieved Jul. 11, 2022 from [https://www.amazon.com/Weber-7030-Traveler-Cargo-Protector/dp/B08PV58HCT/], 10 pages.

United States Patent and Trademark Office, "Notice of Allowance," issued in connection with U.S. Appl. No. 29/753,367, dated Aug. 22, 2022, 5 pages.

* cited by examiner

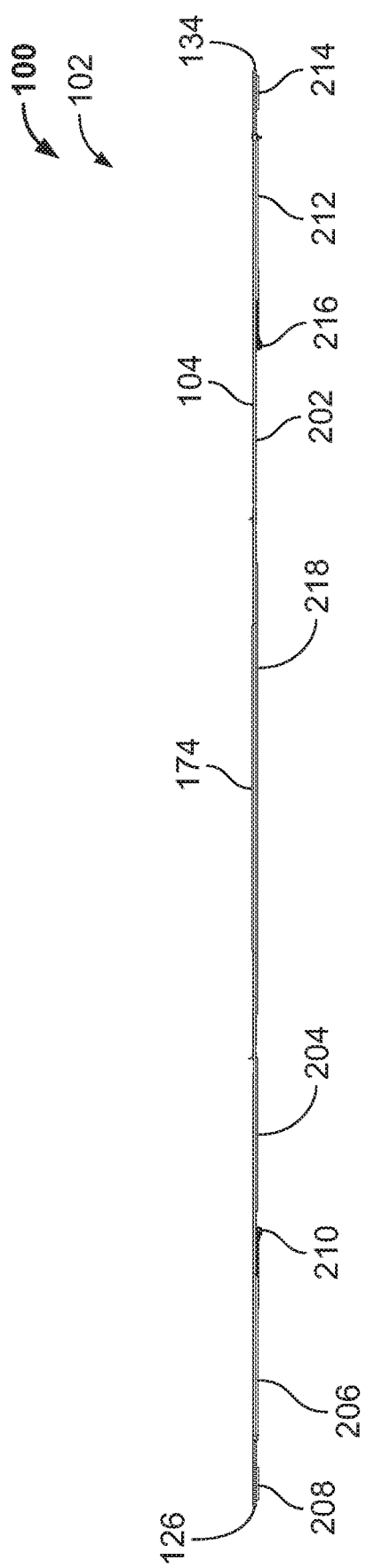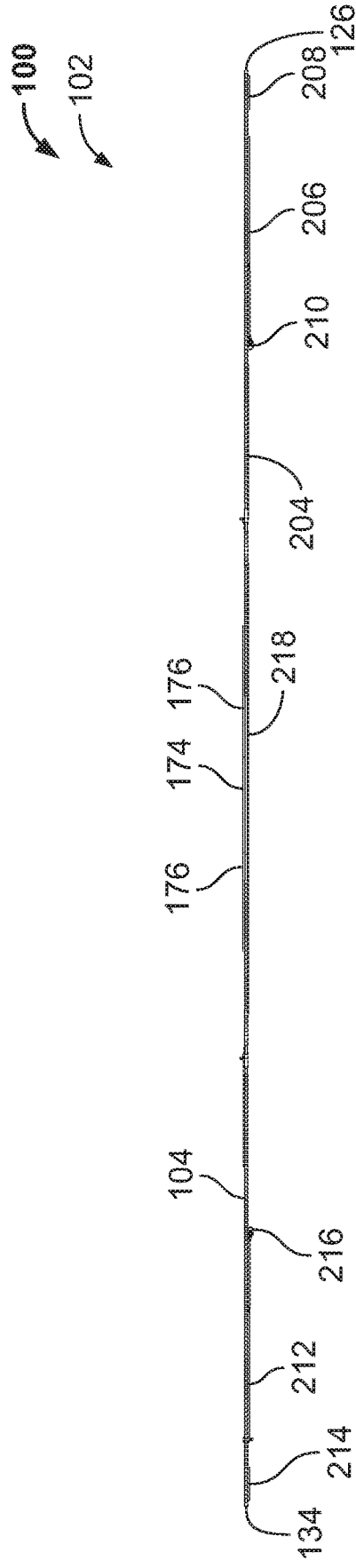
FIG. 5
FIG. 6

CASES FOR PORTABLE GRILLS

FIELD OF THE DISCLOSURE

This disclosure relates generally to cases and, more specifically, to cases for portable grills.

BACKGROUND

Portable grills are intended to be transported from a storage location (e.g., a home, a garage, a shed, a commercial storage unit, a vehicle, etc.) to a variety of remotely-located destinations which may be suitable for using the portable grill to cook food. For example, portable grills are commonly transported to campsites, tailgating sites, hiking sites, parks, beaches, etc. for use at such destinations. Portable grills are conventionally configured to cook (e.g., grill, smoke, bake, roast, broil, sear, and/or otherwise heat) food items located within (e.g., placed on one or more cooking grate(s) positioned within) a cooking chamber of the portable grill.

Many portable grills are capable of being transitioned (e.g., via one or more foldable and/or collapsible leg(s) of the portable grill) between an erected configuration that is intended and/or purposed for cooking food, and a collapsed configuration that is intended and/or purposed for transporting and/or stowing the portable grill at a time when it is not being used to cook food. Such portable grills typically have a reduced form factor (e.g., a reduced height and/or a reduced width) when positioned in their collapsed configuration relative to the corresponding form factor when positioned in their erected configuration. In some instances, the reduced form factor associated with the collapsed configuration of the portable grill facilitates loading the portable grill into a storage compartment (e.g., a trunk, a flatbed, a cargo area, etc.) of a vehicle. In some such instances, the portable grill may be unable to fit within the storage compartment when the portable grill is positioned in the erected configuration, but is able to fit within the storage compartment when the portable grill is positioned in the collapsed configuration.

Many portable grills can be covered or encased (e.g., partially encased, or fully encased) when not actively being used to perform a cooking operation. In some instances, a cover placed over a portable grill can advantageously protect the portable grill from inclement weather (e.g., rain, snow, etc.) and/or surrounding debris. In some instances, a portable grill can be loaded into a case that advantageously prevents dirt and/or residual cooking material (e.g., grease, ash, food byproducts, etc.) located on and/or within the portable grill from coming into contact with an underlying support surface (e.g., an interior of a vehicle trunk, a garage floor, etc.) associated with transporting or storing the portable grill. In some such instances, the case may surround the bottom, the top, and the sides of the portable grill such that the case substantially or completely encases the portable grill. In some such instances, the case can advantageously prevent dirt and/or residual cooking material located on and/or within the portable grill from coming into contact with an underlying support surface, and can also advantageously protect the portable grill from inclement weather and/or surrounding debris.

BRIEF DESCRIPTION OF THE DRAWINGS

FIG. 5 is a right side view of the case of FIGS. 1-4, with the case shown positioned in the open configuration of FIGS. 1-4.

FIG. 6 is a left side view of the case of FIGS. 1-5, with the case shown positioned in the open configuration of FIGS. 1-5.

Figure 1:
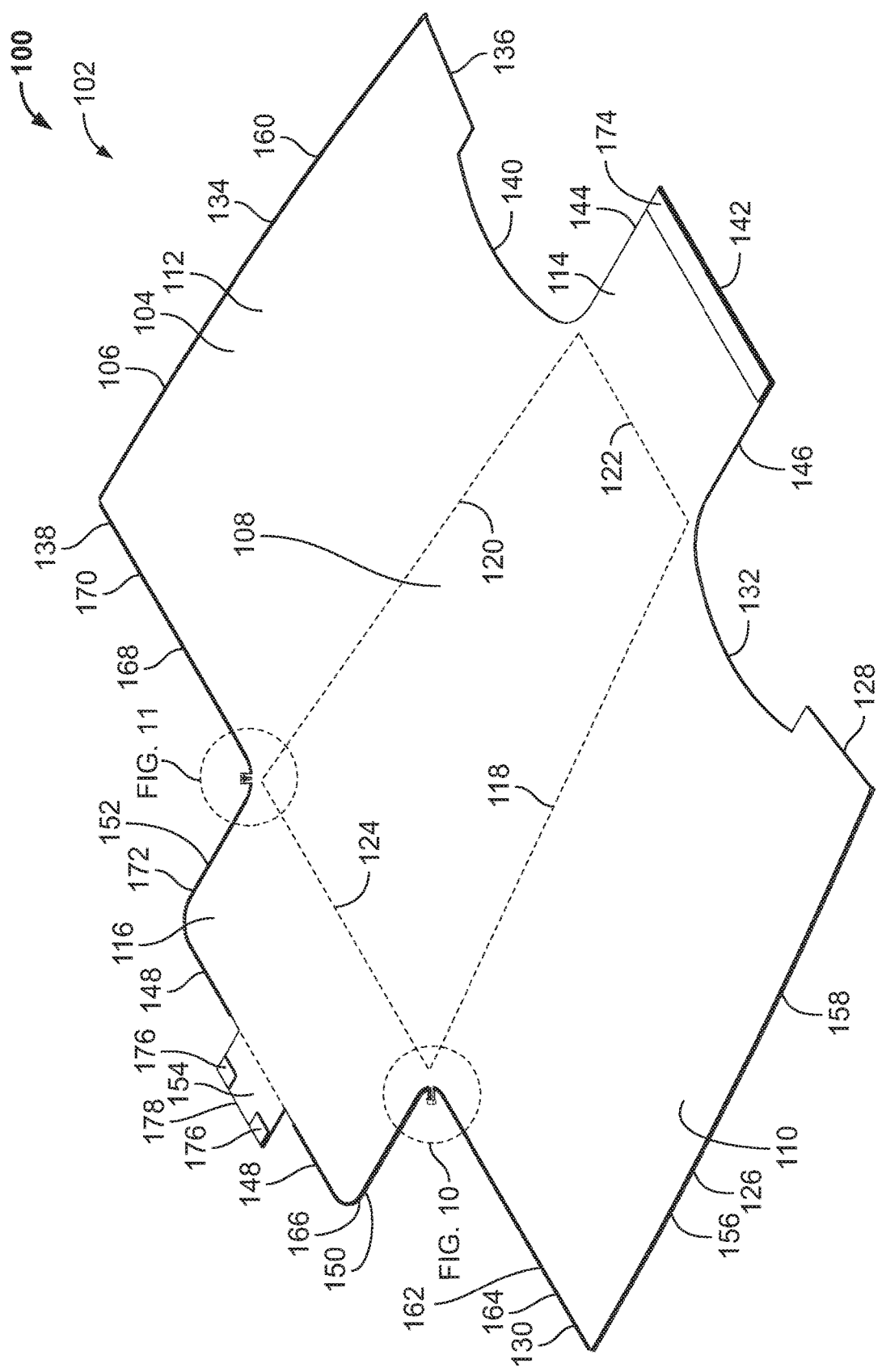
FIG. 1 is a first perspective view of an example case constructed in accordance with teachings of this disclosure, with the case shown positioned in an example open configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example portable grill cases disclosed herein provide numerous advantages over conventional portable grill cases. For example, the disclosed portable grill cases are advantageously configured to be selectively positioned in an open configuration in which a portable grill can be loaded onto the case while the case lies substantially flat on a substantially planar underlying support surface, a closed configuration in which the portable grill can be contained within and/or substantially encased by the case, and a vehicle loading configuration in which the portable grill can be loaded onto and/or removed from the case while the case remains located in a trunk compartment of a vehicle.

The disclosed portable grill cases are configured to be located in a trunk compartment of a vehicle when positioned in the vehicle loading configuration, such that the case advantageously operates as a trunk protector for the trunk compartment of the vehicle. In this regard, the disclosed portable grill cases are configured to prevent dirt and/or residual cooking material (e.g., grease, ash, food byproducts, etc.) located on and/or within a portable grill from coming into contact with the trunk compartment of the vehicle when the portable grill is located on and/or within the case while the case is located within the trunk compartment. The disclosed portable grill cases accordingly provide a protective barrier between the portable grill and the trunk compartment of the vehicle, which ensures that the portable grill can be loaded into the trunk compartment of the vehicle and transported from one location to another without the portable grill transferring dirt and/or residual cooking material to the trunk compartment.

As another example, the disclosed portable grill cases are further configured to be quickly and easily transitioned from any one of the open, closed, or vehicle loading configurations to any other one of the open, closed, or vehicle loading configurations via a plurality of fastening mechanisms. In this regard, the disclosed portable grill cases include a plurality of fasteners (e.g., a combination of zippers and hook and loop fasteners), the fastening components of which can be disengaged, disjoined, and/or separated when the case is positioned in either the open configuration or the vehicle loading configuration, and which can be engaged, joined, and/or attached when the case is positioned in the closed configuration.

In some examples, portable grill cases disclosed herein include a base, a first flap extending from the base, a second flap extending from the base, a third flap extending from the base, and a fourth flap extending from the base, with the base being centrally located relative to the first, second, third, and fourth flaps. When the case is positioned in the open configuration, the first flap extends radially away from the base in a first direction, the second flap extends radially away from the base in a second direction that differs from the first direction, the third flap extends radially away from the base in a third direction that differs from the first and second directions, and the fourth flap extends radially away from the base in a fourth direction that differs from the first, second, and third directions. When the case is positioned in the closed configuration, the first flap, the second flap, the third flap, and the fourth flap respectively extend upwardly from the base, with the base, the first flap, the second flap, the third flap, and the fourth flap being respectively positioned to substantially encase a portable grill loaded onto the base. When the case is positioned in the vehicle loading configuration, the first flap, the third flap, and the fourth flap respectively extend upwardly from the base, and the second flap extends downwardly from the base, wherein the base is configured to be positioned against an interior floor of the trunk compartment, the first flap is configured to be positioned against an interior seat back of the trunk compartment, the third flap is configured to be positioned against a first interior sidewall of the trunk compartment, and the fourth flap is configured to be positioned against a second interior sidewall of the trunk compartment.

The above-identified features as well as other advantageous features of the disclosed portable grill cases are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field. As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of zippers, hook and loop fasteners, ties, pins, clips, latches, adhesives, bolts, nuts, screws, etc.

Figure 2:
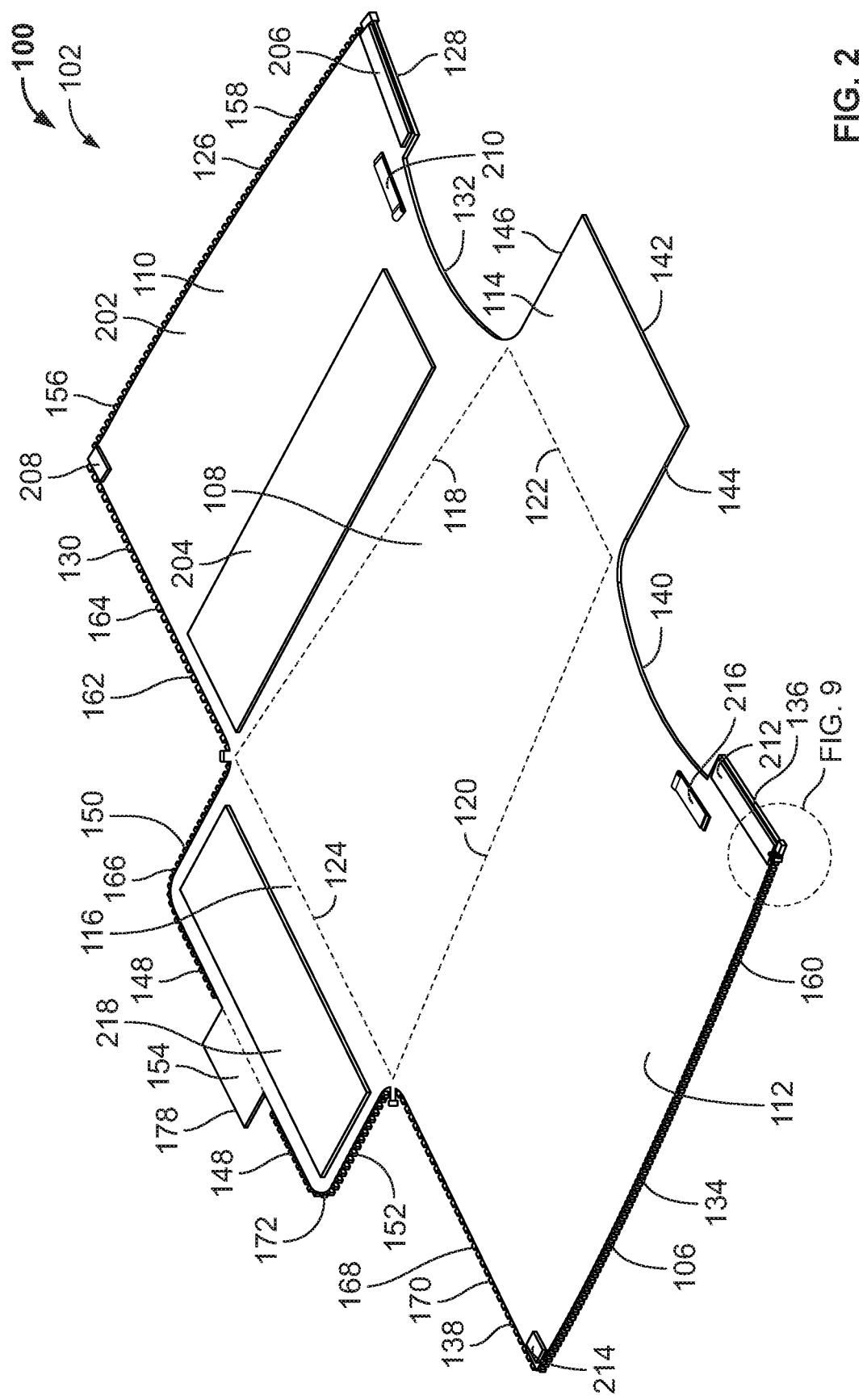
FIG. 2 is a second perspective view of the case of FIG. 1, with the case shown positioned in the open configuration of FIG. 1.
Figure 3:
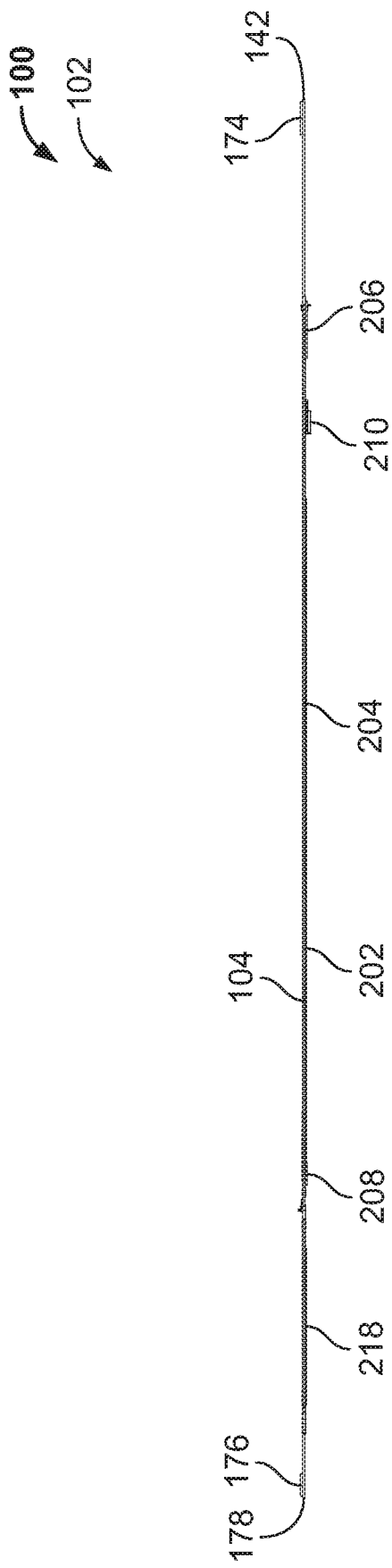
FIG. 3 is a front view of the case of FIGS. 1 and 2, with the case shown positioned in the open configuration of FIGS. 1 and 2.
Figure 4:
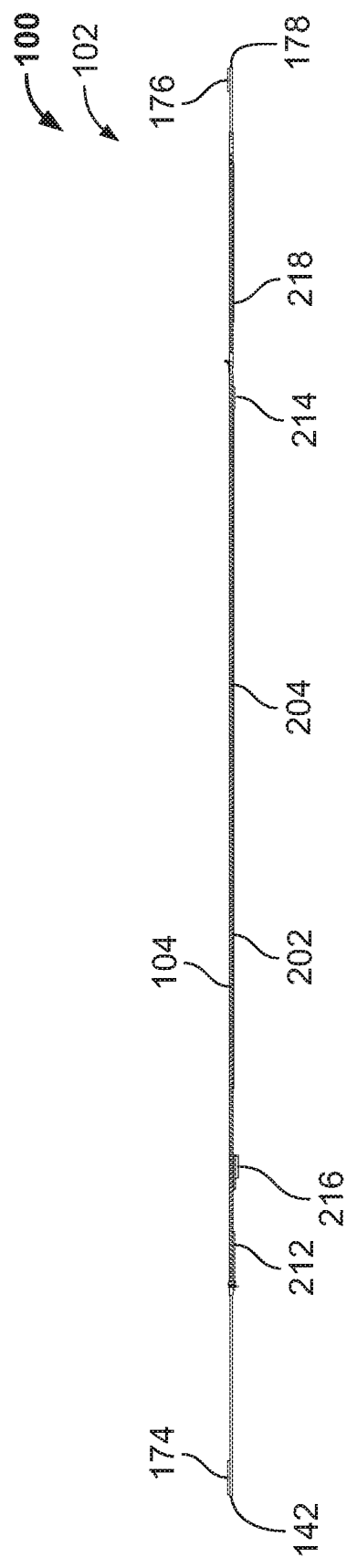
FIG. 4 is a rear view of the case of FIGS. 1-3, with the case shown positioned in the open configuration of FIGS. 1-3.
Figure 7:
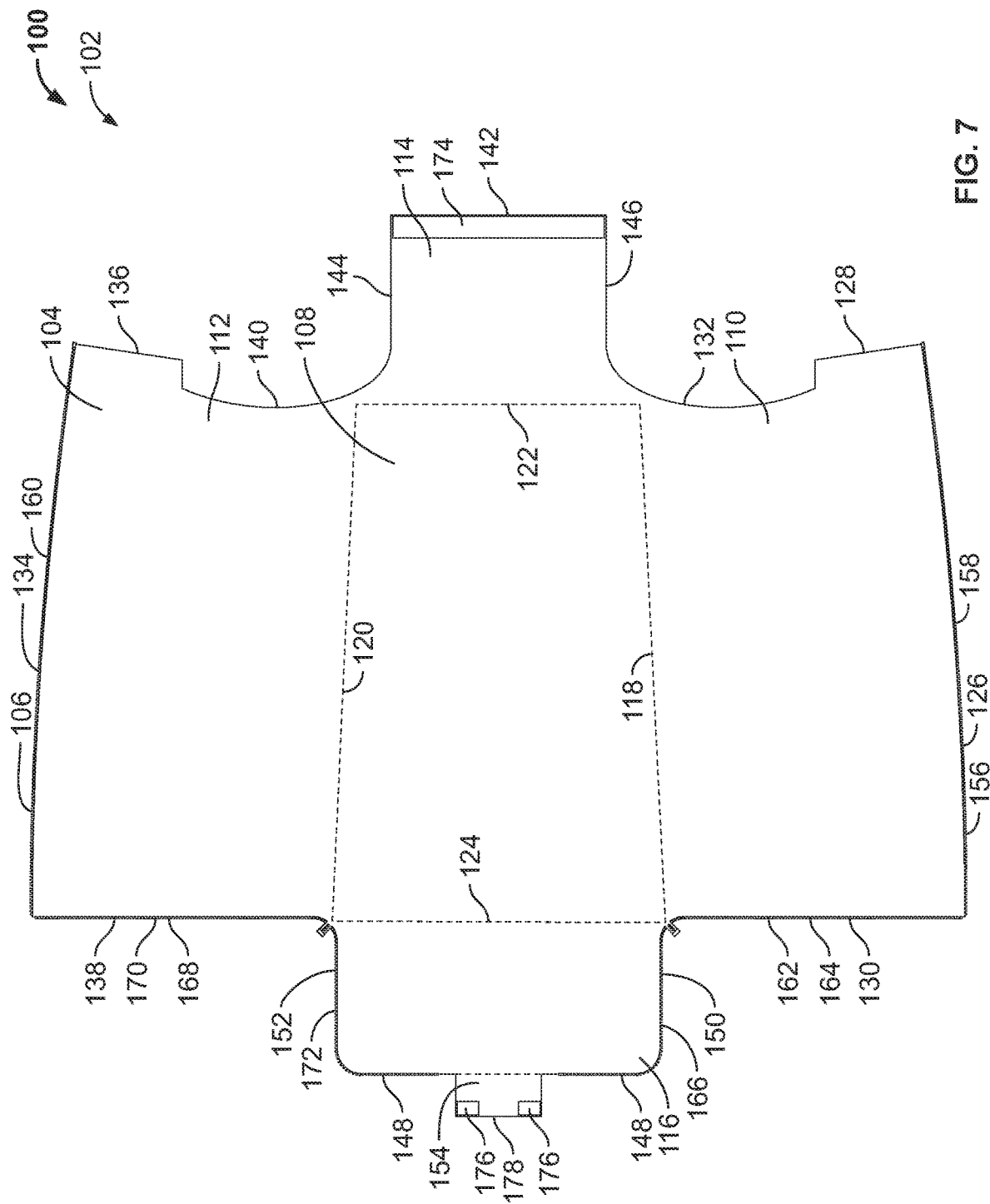
FIG. 7 is a top view of the case of FIGS. 1-6, with the case shown positioned in the open configuration of FIGS. 1-6.
Figure 8:
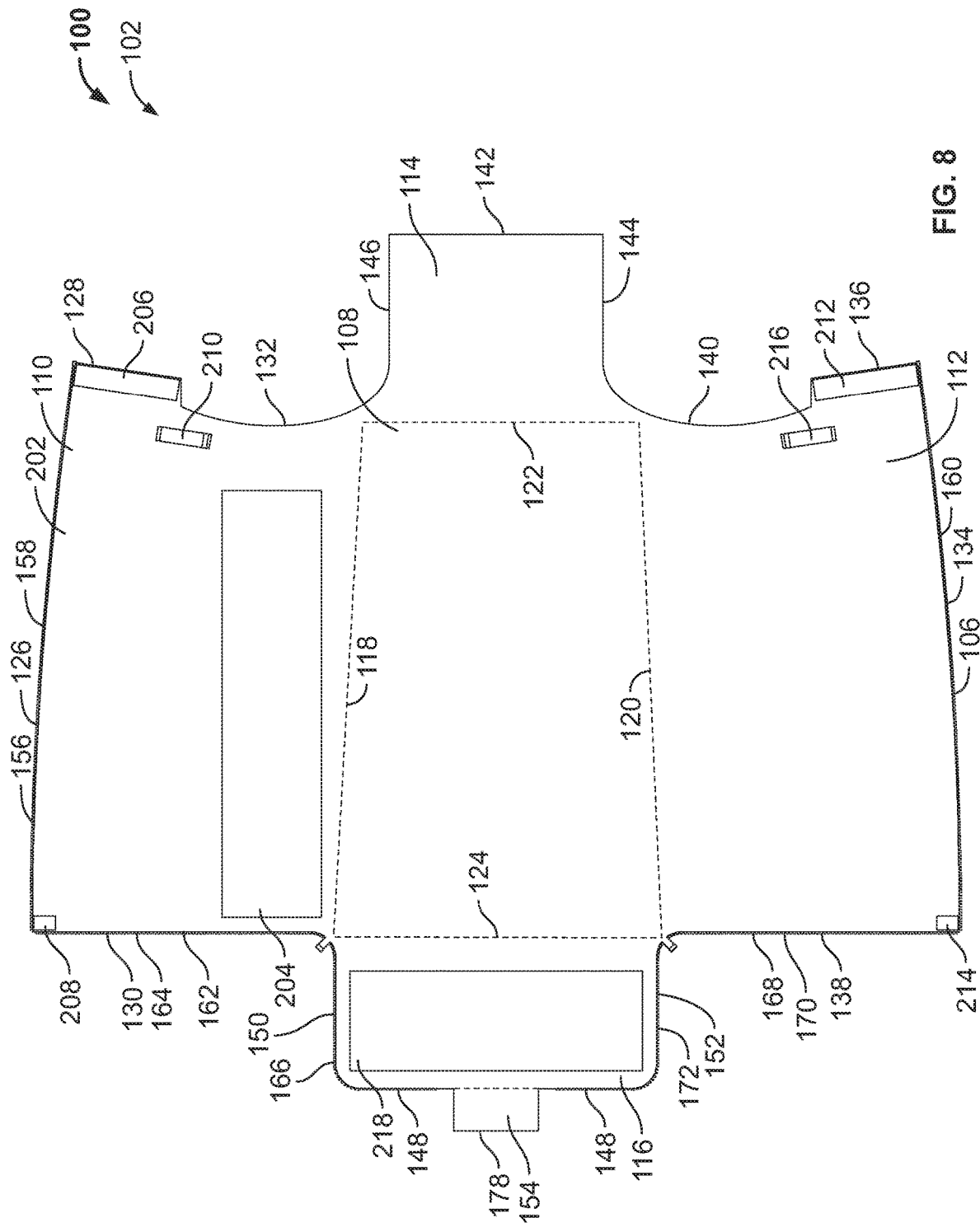
FIG. 8 is a bottom view of the case of FIGS. 1-7, with the case shown positioned in the open configuration of FIGS. 1-7.

FIGS. 1-8 illustrate an example case 100 constructed in accordance with the teachings of this disclosure, with the case 100 shown positioned in an example open configuration 102. More specifically, FIG. 1 is a first perspective view of the case 100, with the case 100 shown positioned in the open configuration 102. FIG. 2 is a second perspective view of the case 100, with the case 100 shown positioned in the open configuration 102. FIG. 3 is a front view of the case 100, with the case 100 shown positioned in the open configuration 102. FIG. 4 is a rear view of the case 100, with the case 100 shown positioned in the open configuration 102. FIG. 5 is a right side view of the case 100, with the case 100 shown positioned in the open configuration 102. FIG. 6 is a left side view of the case 100, with the case 100 shown positioned in the open configuration 102. FIG. 7 is a top view of the case 100, with the case 100 shown positioned in the open configuration 102. FIG. 8 is a bottom view of the case 100, with the case 100 shown positioned in the open configuration 102. The case 100 of FIGS. 1-8 is configured to be positioned in the open configuration 102 shown in FIGS. 1-8 prior to or during a portable grill (e.g., the portable grill 1200 of FIG. 12) being loaded onto or into the case 100, and/or subsequent to or during a portable grill (e.g., the portable grill 1200 of FIG. 12) being unloaded from the case 100.

The case 100 of FIGS. 1-8 includes an example first side 104, an example second side 202 located opposite the first side 104, and an example periphery 106 defined as an outer edge extending between the first side 104 and the second side 202 of the case 100. In some examples, the case 100 of FIGS. 1-8 is positioned in the open configuration 102 shown in FIGS. 1-8 with the second side 202 of the case 100 located on and/or in contact with an underlying support surface (e.g., an outdoor or indoor ground surface), and with the first side 104 of the case 100 facing away from the underlying support surface. In such examples, the first side 104 of the case 100 is an interior surface configured to face toward a portable grill once the portable grill has been loaded onto the first side 104 of the case 100, and the second side 202 of the case 100 is an exterior surface configured to face away from the portable grill once the portable grill has been loaded onto the first side 104 of the case 100, as further described below.

The case 100 of FIGS. 1-8 further includes an example base 108, an example first flap 110, an example second flap 112, an example third flap 114, and an example fourth flap 116. The base 108, the first flap 110, the second flap 112, the third flap 114, and the fourth flap 116 of the case 100 are respectively constructed of a flexible material (e.g., a fabric, a pliable plastic film, etc.) that enables the first flap 110, the second flap 112, the third flap 114, and/or the fourth flap 116 to move (e.g., bend or fold) relative to the base 108 of the case 100, and/or relative to one another. In some examples, the base 108, the first flap 110, the second flap 112, the third flap 114, and the fourth flap 116 of the case 100 are respectively constructed of a flexible, watertight material (e.g., a plastic-coated fabric, a pliable plastic film, etc.) that creates a bidirectional water-impermeable barrier. In such examples, the flexible, watertight material of the case 100 prevents fluid and/or moisture from passing through the first side 104 of the case 100 to the second side 202 of the case 100, and further prevents fluid and/or moisture from passing through the second side 202 of the case to the first side 104 of the case 100.

In the illustrated example of FIGS. 1-8, the base 108 is centrally located relative to the first flap 110, the second flap 112, the third flap 114, and the fourth flap 116 in combination. In this regard, the base 108 is bounded collectively by (1) an example first boundary 118 that generally defines the end of the base 108 and the beginning of the first flap 110, (2) an example second boundary 120 that generally defines the end of the base 108 and the beginning of the second flap 112, (3) an example third boundary 122 that generally defines the end of the base 108 and the beginning of the third flap 114, and (4) an example fourth boundary 124 that generally defines the end of the base 108 and the beginning of the fourth flap 116. As shown in FIGS. 1-8, the first flap 110 extends radially away from the first boundary 118 of the base 108 in a first direction, the second flap 112 extends radially away from the second boundary 120 of the base 108 in a second direction that is generally opposite the first direction, the third flap 114 extends radially away from the third boundary 122 of the base 108 in a third direction that is generally orthogonal to the first and second directions, and the fourth flap 116 extends radially away from the fourth boundary 124 of the base 108 in a fourth direction that is generally opposite the third direction. The case 100 as a whole accordingly has a cross-shaped profile when the case 100 is positioned in the open configuration 102 shown in FIGS. 1-8. In this regard, the base 108, the first flap 110, the second flap 112, the third flap 114, and the fourth flap 116 of the case 100 respectively extend and/or lie in a common plane when the case 100 is positioned in the open configuration 102 shown in FIGS. 1-8.

In the illustrated example of FIGS. 1-8, the base 108 of the case 100 has a quadrilateral (e.g., trapezoidal) profile that is generally defined by the first boundary 118, the second boundary 120, the third boundary 122, and the fourth boundary 124 of the base 108. In other examples, the base 108 can have a profile that is shaped differently from the quadrilateral profile shown in FIGS. 1-8. For example, the base 108 can alternatively have a triangular profile, a hexagonal profile, an elliptical profile, etc. In the illustrated example of FIGS. 1-8, the first flap 110, the second flap 112, the third flap 114, and the fourth flap 116 of the case 100 are respectively integrally formed with the base 108 of the case 100. In this regard, the base 108, the first flap 110, the second flap 112, the third flap 114, and the fourth flap 116 of the case 100 are preferably formed from a continuous sheet of material (e.g., a single-ply sheet, a multi-ply sheet, a woven fabric, etc.) that has been cut to provide the shape of the case 100 shown in FIGS. 1-8. In other examples, the first flap 110, the second flap 112, the third flap 114, and/or the fourth flap 116 of the case 100 can alternatively be coupled to the base 108 of the case 100 via one or more fastener(s) spanning one or more seam(s) generally located at the first boundary 118, the second boundary 120, the third boundary 122, and the fourth boundary 124 of the base 108.

The first flap 110 of the case 100 of FIGS. 1-8 includes an example first edge 126, an example second edge 128, and an example third edge 130. In the illustrated example of FIGS. 1-8, the first edge 126, the second edge 128, and the third edge 130 of the first flap 110 respectively form one or more portion(s) of the periphery 106 of the case 100. The first edge 126 of the first flap 110 is spaced apart from the first boundary 118 of the of the base 108, and generally extends in a direction that is substantially parallel relative to the first boundary 118 of the base 108. The second edge 128 of the first flap 110 extends between the first edge 126 of the first flap 110 and the first boundary 118 of the base 108, and generally extends in a direction that is substantially orthogonal relative to the first boundary 118 of the base 108 and/or relative to the first edge 126 of the first flap 110. The third edge 130 of the first flap 110 is spaced apart from the second edge 128 of the first flap 110, extends between the first edge 126 of the first flap 110 and the first boundary 118 of the base 108, and generally extends in a direction that is substantially orthogonal relative to the first boundary 118 of the base 108 and/or relative to the first edge 126 of the first flap 110.

In the illustrated example of FIGS. 1-8, the second edge 128 of the first flap 110 includes an example cutout 132 (e.g., a contoured cutout) that extends inwardly toward the third edge 130 of the first flap 110. The cutout 132 of the second edge 128 of the first flap 110 is configured to receive a portion (e.g., a handle) of a portable grill when the case is positioned in a closed configuration with the portable grill loaded therein, as further described below. In other examples, the cutout 132 of the second edge 128 of the first flap 110 can alternatively be omitted, and the second edge 128 of the first flap 110 can accordingly extend between the first edge 126 of the first flap 110 and the first boundary 118 of the base 108 in a linear manner, similar to the linear manner by which the third edge 130 of the first flap 110 extends between the first edge 126 of the first flap 110 and the first boundary 118 of the base 108 as shown in FIGS. 1-8. In the illustrated example of FIGS. 1-8, the first flap 110 of the case 100 has a quadrilateral profile that is generally defined by the first boundary 118 of the base 108, the first edge 126 of the first flap 110, the second edge 128 of the first flap 110 (e.g., ignoring the cutout 132), and the third edge 130 of the first flap 110. In other examples, the first flap 110 can have a profile that is shaped differently from the quadrilateral profile shown in FIGS. 1-8. For example, the first flap 110 can alternatively have a triangular profile, a hexagonal profile, an elliptical profile, etc.

The second flap 112 of the case 100 of FIGS. 1-8 includes an example first edge 134, an example second edge 136, and an example third edge 138. In the illustrated example of FIGS. 1-8, the first edge 134, the second edge 136, and the third edge 138 of the second flap 112 respectively form one or more portion(s) of the periphery 106 of the case 100. The first edge 134 of the second flap 112 is spaced apart from the second boundary 120 of the of the base 108, and generally extends in a direction that is substantially parallel relative to the second boundary 120 of the base 108. The second edge 136 of the second flap 112 extends between the first edge 134 of the second flap 112 and the second boundary 120 of the base 108, and generally extends in a direction that is substantially orthogonal relative to the second boundary 120 of the base 108 and/or relative to the first edge 134 of the second flap 112. The third edge 138 of the second flap 112 is spaced apart from the second edge 136 of the second flap 112, extends between the first edge 134 of the second flap 112 and the second boundary 120 of the base 108, and generally extends in a direction that is substantially orthogonal relative to the second boundary 120 of the base 108 and/or relative to the first edge 134 of the second flap 112.

In the illustrated example of FIGS. 1-8, the second edge 136 of the second flap 112 includes an example cutout 140 (e.g., a contoured cutout) that extends inwardly toward the third edge 138 of the second flap 112. The cutout 140 of the second edge 136 of the second flap 112 is configured to receive a portion (e.g., a handle) of a portable grill when the case is positioned in a closed configuration with the portable grill loaded therein, as further described below. In other examples, the cutout 140 of the second edge 136 of the second flap 112 can alternatively be omitted, and the second edge 136 of the second flap 112 can accordingly extend between the first edge 134 of the second flap 112 and the second boundary 120 of the base 108 in a linear manner, similar to the linear manner by which the third edge 138 of the second flap 112 extends between the first edge 134 of the second flap 112 and the second boundary 120 of the base 108 as shown in FIGS. 1-8. In the illustrated example of FIGS. 1-8, the second flap 112 of the case 100 has a quadrilateral profile that is generally defined by the second boundary 120 of the base 108, the first edge 134 of the second flap 112, the second edge 136 of the second flap 112 (e.g., ignoring the cutout 140), and the third edge 138 of the second flap 112. In other examples, the second flap 112 can have a profile that is shaped differently from the quadrilateral profile shown in FIGS. 1-8. For example, the second flap 112 can alternatively have a triangular profile, a hexagonal profile, an elliptical profile, etc.

The third flap 114 of the case 100 of FIGS. 1-8 includes an example first edge 142, an example second edge 144, and an example third edge 146. In the illustrated example of FIGS. 1-8, the first edge 142, the second edge 144, and the third edge 146 of the third flap 114 respectively form one or more portion(s) of the periphery 106 of the case 100. The first edge 142 of the third flap 114 is spaced apart from the third boundary 122 of the base 108, and generally extends in a direction that is substantially parallel relative to the third boundary 122 of the base 108. The second edge 144 of the third flap 114 extends between the first edge 142 of the third flap 114 and the third boundary 122 of the base 108, and generally extends in a direction that is substantially orthogonal relative to the third boundary 122 of the base 108 and/or relative to the first edge 142 of the third flap 114. The third edge 146 of the third flap 114 is spaced apart from the second edge 144 of the third flap 114, extends between the first edge 142 of the third flap 114 and the third boundary 122 of the base 108, and generally extends in a direction that is substantially orthogonal relative to the third boundary 122 of the base 108 and/or relative to the first edge 142 of the third flap 114.

In the illustrated example of FIGS. 1-8, the third flap 114 of the case 100 has a quadrilateral profile that is generally defined by the third boundary 122 of the base 108, the first edge 142 of the third flap 114, the second edge 144 of the third flap 114, and the third edge 146 of the third flap 114. In other examples, the third flap 114 can have a profile that is shaped differently from the quadrilateral profile shown in FIGS. 1-8. For example, the third flap 114 can alternatively have a triangular profile, a hexagonal profile, an elliptical profile, etc.

The fourth flap 116 of the case 100 of FIGS. 1-8 includes an example first edge 148, an example second edge 150, and an example third edge 152. In the illustrated example of FIGS. 1-8, the first edge 148, the second edge 150, and the third edge 152 of the fourth flap 116 respectively form one or more portion(s) of the periphery 106 of the case 100. The first edge 148 of the fourth flap 116 is spaced apart from the fourth boundary 124 of the of the base 108, and generally extends in a direction that is substantially parallel relative to the fourth boundary 124 of the base 108. The second edge 150 of the fourth flap 116 extends between the first edge 148 of the fourth flap 116 and the fourth boundary 124 of the base 108, and generally extends in a direction that is substantially orthogonal relative to the fourth boundary 124 of the base 108 and/or relative to the first edge 148 of the fourth flap 116. The third edge 152 of the fourth flap 116 is spaced apart from the second edge 150 of the fourth flap 116, extends between the first edge 148 of the fourth flap 116 and the fourth boundary 124 of the base 108, and generally extends in a direction that is substantially orthogonal relative to the fourth boundary 124 of the base 108 and/or relative to the first edge 148 of the fourth flap 116.

In the illustrated example of FIGS. 1-8, the fourth flap 116 further includes an example closure tab 154 that extends outwardly from the first edge 148 of the fourth flap 116. The closure tab 154 of the fourth flap 116 is configured to cover a portion of a fastener (e.g. a slider of a zipper) of the case 100 when the case is positioned in a closed configuration with a portable grill loaded therein, as further described below. In other examples, the closure tab 154 of the fourth flap 116 can alternatively be omitted. In the illustrated example of FIGS. 1-8, the fourth flap 116 of the case 100 has a quadrilateral profile that is generally defined by the fourth boundary 124 of the base 108, the first edge 148 of the fourth flap 116 (e.g., ignoring the closure tab 154), the second edge 150 of the fourth flap 116, and the third edge 152 of the fourth flap 116. In other examples, the fourth flap 116 can have a profile that is shaped differently from the quadrilateral profile shown in FIGS. 1-8. For example, the fourth flap 116 can alternatively have a triangular profile, a hexagonal profile, an elliptical profile, etc.

Figure 9:
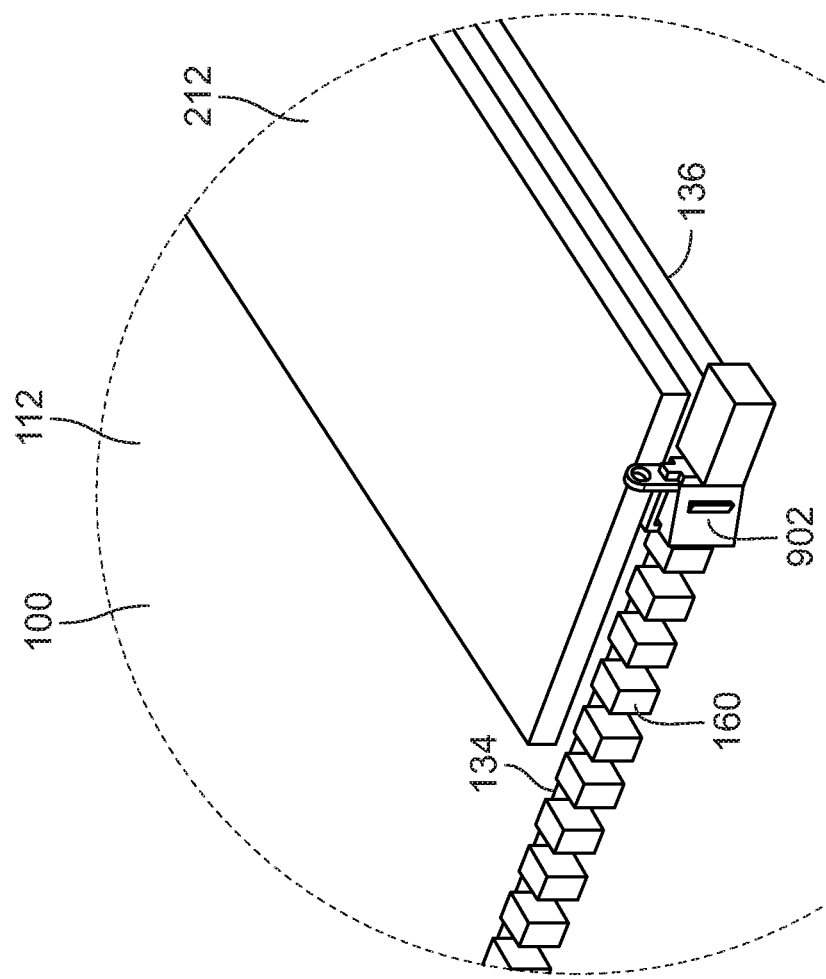
FIG. 9 is an enlarged view of a portion of the first zipper of the case of FIGS. 1-8, with the case shown positioned in the open configuration of FIGS. 1-8.

The case 100 of FIGS. 1-8 further includes one or more fastener(s) configured to assist the transitioning of the case 100 from the open configuration 102 shown in FIGS. 1-8 into a closed configuration, and vice-versa. For example, the case 100 of FIGS. 1-8 includes an example first zipper 156 configured to removably couple the first flap 110 of the case 100 to the second flap 112 of the case 100. FIG. 9 is an enlarged view of a portion of the first zipper 156 of the case 100 of FIGS. 1-8, with the case 100 shown positioned in the open configuration 102 of FIGS. 1-8. In the illustrated example of FIGS. 1-9, the first zipper 156 of the case 100 includes an example first set of teeth 158 coupled to and extending along the first edge 126 of the first flap 110 of the case 100, and an example second set of teeth 160 coupled to and extending along the first edge 134 of the second flap 112 of the case 100. The first zipper 156 of the case 100 further includes an example slider 902 slidably coupled to the first set of teeth 158 and/or slidably coupled to the second set of teeth 160.

The first zipper 156 of the case 100 is in an unfastened state (e.g., with the first set of teeth 158 separated and/or disjoined from the second set of teeth 160) when the case 100 is in the open configuration shown in FIGS. 1-9. The first zipper 156 of the case 100 can be transitioned from the unfastened state into a fastened state (e.g., with the first set of teeth 158 attached and/or joined to the second set of teeth 160) in connection with transitioning the case 100 from the open configuration 102 shown in FIGS. 1-9 into a closed configuration, as further described below. In some examples, a pull tab is coupled to or integrally formed with the slider 902. In such examples, the pull tab is configured to improve the ease with which a user can move (e.g., pull or push) the slider 902 along the first set of teeth 158 of the first zipper 156 and/or along the second set of teeth 160 of the first zipper 156 in connection with fastening the first set of teeth 158 to, and/or unfastening the first set of teeth 158 from, the second set of teeth 160.

Figure 10:
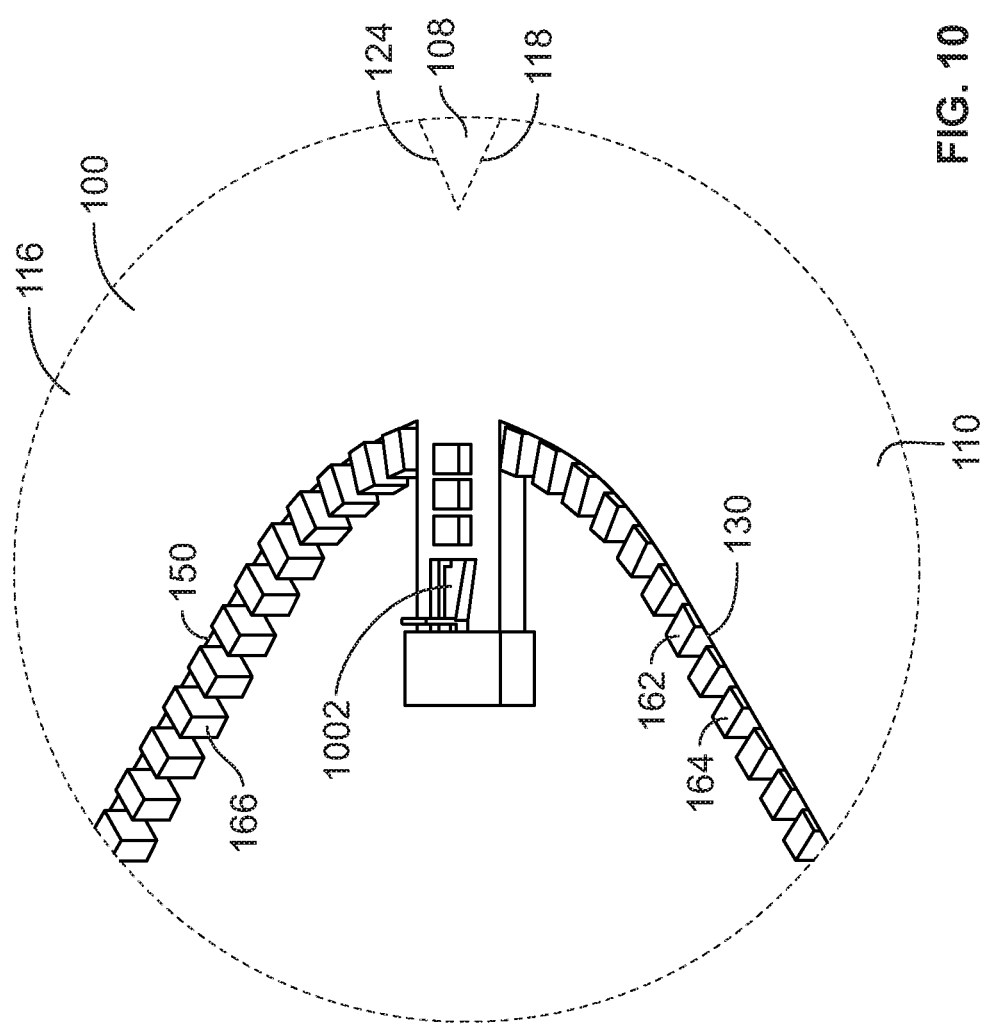
FIG. 10 is an enlarged view of a portion of the second zipper of the case of FIGS. 1-8, with the case shown positioned in the open configuration of FIGS. 1-8.

The case 100 of FIGS. 1-8 also includes an example second zipper 162 configured to removably couple the first flap 110 of the case 100 to the fourth flap 116 of the case 100. FIG. 10 is an enlarged view of a portion of the second zipper 162 of the case 100 of FIGS. 1-8, with the case 100 shown positioned in the open configuration 102 of FIGS. 1-8. In the illustrated example of FIGS. 1-8 and 10, the second zipper 162 of the case 100 includes an example first set of teeth 164 coupled to and extending along the third edge 130 of the first flap 110 of the case 100, and an example second set of teeth 166 coupled to and extending along the second edge 150 and/or the first edge 148 of the fourth flap 116 of the case 100. The second zipper 162 of the case 100 further includes an example slider 1002 slidably coupled to the first set of teeth 164 and/or slidably coupled to the second set of teeth 166.

The second zipper 162 of the case 100 is in an unfastened state (e.g., with the first set of teeth 164 separated and/or disjoined from the second set of teeth 166) when the case 100 is in the open configuration shown in FIGS. 1-8 and 10. The second zipper 162 of the case 100 can be transitioned from the unfastened state into a fastened state (e.g., with the first set of teeth 164 attached and/or joined to the second set of teeth 166) in connection with transitioning the case 100 from the open configuration 102 shown in FIGS. 1-8 and 10 into a closed configuration, as further described below. In some examples, a pull tab is coupled to or integrally formed with the slider 1002. In such examples, the pull tab is configured to improve the ease with which a user can move (e.g., pull or push) the slider 1002 along the first set of teeth 164 of the second zipper 162 and/or along the second set of teeth 166 of the second zipper 162 in connection with fastening the first set of teeth 164 to, and/or unfastening the first set of teeth 164 from, the second set of teeth 166.

Figure 11:
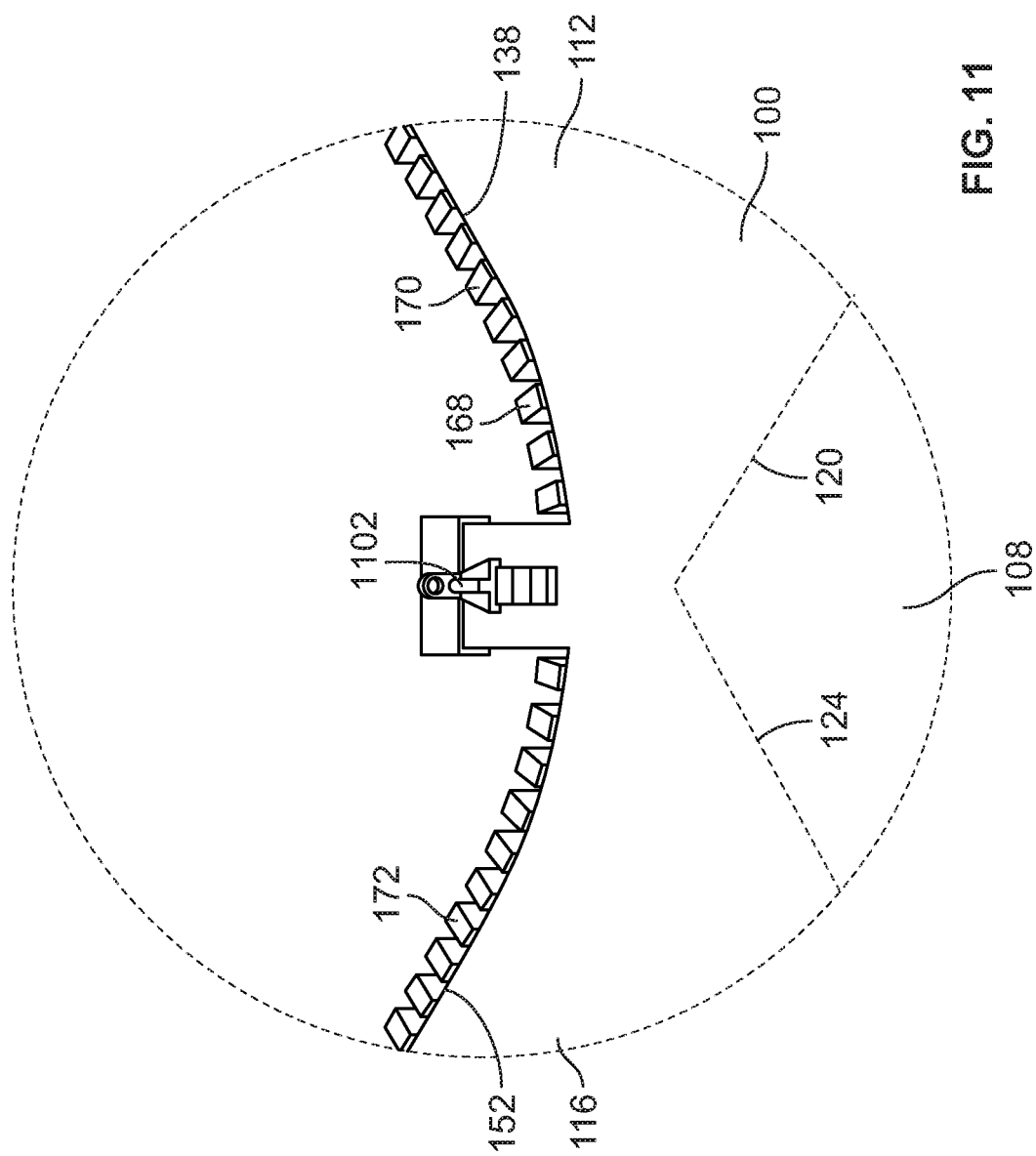
FIG. 11 is an enlarged view of a portion of the third zipper of the case of FIGS. 1-8, with the case shown positioned in the open configuration of FIGS. 1-8.

The case 100 of FIGS. 1-8 also includes an example third zipper 168 configured to removably couple the second flap 112 of the case 100 to the fourth flap 116 of the case 100. FIG. 11 is an enlarged view of a portion of the third zipper 168 of the case 100 of FIGS. 1-8, with the case 100 shown positioned in the open configuration 102 of FIGS. 1-8. In the illustrated example of FIGS. 1-8 and 11, the third zipper 168 of the case 100 includes an example first set of teeth 170 coupled to and extending along the third edge 138 of the second flap 112 of the case 100, and an example second set of teeth 172 coupled to and extending along the third edge 152 and/or the first edge 148 of the fourth flap 116 of the case 100. The third zipper 168 of the case 100 further includes an example slider 1102 slidably coupled to the first set of teeth 170 and/or slidably coupled to the second set of teeth 172.

The third zipper 168 is in an unfastened state (e.g., with the first set of teeth 170 separated and/or disjoined from the second set of teeth 172) when the case 100 is in the open configuration shown in FIGS. 1-8 and 11. The third zipper 168 of the case 100 can be transitioned from the unfastened state into a fastened state (e.g., with the first set of teeth 170 attached and/or joined to the second set of teeth 172) in connection with transitioning the case 100 from the open configuration 102 shown in FIGS. 1-8 and 11 into a closed configuration, as further described below. In some examples, a pull tab is coupled to or integrally formed with the slider 1102. In such examples, the pull tab is configured to improve the ease with which a user can move (e.g., pull or push) the slider 1102 along the first set of teeth 170 of the third zipper 168 and/or along the second set of teeth 172 of the third zipper 168 in connection with fastening the first set of teeth 170 to, and/or unfastening the first set of teeth 170 from, the second set of teeth 172.

The first flap 110 of the case 100 of FIGS. 1-8 further includes an example pocket 204, coupled (e.g., sewn, stitched, and/or otherwise affixed) to the second side 202 of the case 100. The pocket 204 of the first flap 110 is configured to receive various accessories associated with the case 100, and/or associated with a portable grill to be loaded into, transported within, and/or stored within the case 100.

For example, the pocket 204 is configured to receive an instruction manual associated with the case 100, an instruction manual associated with the portable grill, and/or one or more cooking utensil(s) to be used in connection with the portable grill. In this regard, the pocket 204 of the first flap 110 includes an opening along one or more edges of the pocket 204, with the opening configured to enable the aforementioned accessories to be placed into and/or removed from the pocket 204. In the illustrated example of FIGS. 1-8, the pocket 204 of the first flap 110 has a rectangular shape. In other examples, the pocket 204 of the first flap 110 can have a shape that differs from the rectangular shape shown in FIGS. 1-8.

The first flap 110 of the case 100 of FIGS. 1-8 further includes an example fastening strip 206 coupled (e.g., sewn, stitched, and/or otherwise affixed) to the second side 202 of the case 100. The fastening strip 206 of the first flap 110 includes, forms, and/or otherwise provides either a loop component or a hook component of a hook and loop fastener. In the illustrated example of FIGS. 1-8, the fastening strip 206 is located adjacent both the first edge 126 and the second edge 128 of the first flap 110, with the fastening strip 206 extending along the second edge 128 of the first flap 110 from the first edge 126 of the first flap 110 to and/or towards the cutout 132 of the first flap 110. In other examples, the fastening strip 206 of the first flap 110 can be positioned at a different location on the second side 202 of the case 100. In the illustrated example of FIGS. 1-8, the fastening strip 206 of the first flap 110 has a rectangular shape. In other examples, the fastening strip 206 of the first flap 110 can have a shape that differs from the rectangular shape shown in FIGS. 1-8.

The first flap 110 of the case 100 of FIGS. 1-8 further includes an example fastening tab 208 coupled (e.g., sewn, stitched, and/or otherwise affixed) to the second side 202 of the case 100. The fastening tab 208 of the first flap 110 includes, forms, and/or otherwise provides either a loop component or a hook component of a hook and loop fastener. In the illustrated example of FIGS. 1-8, the fastening tab 208 is located adjacent the intersection of the first edge 126 and the third edge 130 of the first flap 110. In other examples, the fastening tab 208 of the first flap 110 can be positioned at a different location on the second side 202 of the case 100. In the illustrated example of FIGS. 1-8, the fastening tab 208 of the first flap 110 has a rectangular shape. In other examples, the fastening tab 208 of the first flap 110 can have a shape that differs from the rectangular shape shown in FIGS. 1-8.

The first flap 110 of the case 100 of FIGS. 1-8 further includes an example fastening strap 210 coupled (e.g., sewn, stitched, and/or otherwise affixed) to the second side 202 of the case 100. The fastening strap 210 of the first flap 110 includes, forms, and/or otherwise provides either a loop component or a hook component of a hook and loop fastener. In the illustrated example of FIGS. 1-8, the fastening strap 210 is located proximate the cutout 132 formed along the second edge 128 of the first flap 110. In other examples, the fastening strap 210 of the first flap 110 can be positioned at a different location on the second side 202 of the case 100. In some examples, the fastening strap 210 of the first flap 110 is foldable back on itself such that a fastening element (e.g., a hook component or a loop component) of the fastening strap 210 is covered and/or not exposed when the case 100 is in the open configuration 102 shown in FIGS. 1-8. In the illustrated example of FIGS. 1-8, the fastening strap 210 of the first flap 110 has a rectangular shape. In other examples, the fastening strap 210 of the first flap 110 can have a shape that differs from the rectangular shape shown in FIGS. 1-8.

The second flap 112 of the case 100 of FIGS. 1-8 further includes an example fastening strip 212 coupled (e.g., sewn, stitched, and/or otherwise affixed) to the second side 202 of the case 100. The fastening strip 212 of the second flap 112 includes, forms, and/or otherwise provides either a loop component or a hook component of a hook and loop fastener. In the illustrated example of FIGS. 1-8, the fastening strip 212 is located adjacent both the first edge 134 and the second edge 136 of the second flap 112, with the fastening strip 212 extending along the second edge 136 of the second flap 112 from the first edge 134 of the second flap 112 to and/or towards the cutout 140 of the second flap 112. In other examples, the fastening strip 212 of the second flap 112 can be positioned at a different location on the second side 202 of the case 100. In the illustrated example of FIGS. 1-8, the fastening strip 212 of the second flap 112 has a rectangular shape. In other examples, the fastening strip 212 of the second flap 112 can have a shape that differs from the rectangular shape shown in FIGS. 1-8.

The second flap 112 of the case 100 of FIGS. 1-8 further includes an example fastening tab 214 coupled (e.g., sewn, stitched, and/or otherwise affixed) to the second side 202 of the case 100. The fastening tab 214 of the second flap 112 includes, forms, and/or otherwise provides either a loop component or a hook component of a hook and loop fastener. In the illustrated example of FIGS. 1-8, the fastening tab 214 is located adjacent the intersection of the first edge 134 and the third edge 138 of the second flap 112. In other examples, the fastening tab 214 of the second flap 112 can be positioned at a different location on the second side 202 of the case 100. In the illustrated example of FIGS. 1-8, the fastening tab 214 of the second flap 112 has a rectangular shape. In other examples, the fastening tab 214 of the second flap 112 can have a shape that differs from the rectangular shape shown in FIGS. 1-8.

The second flap 112 of the case 100 of FIGS. 1-8 further includes an example fastening strap 216 coupled (e.g., sewn, stitched, and/or otherwise affixed) to the second side 202 of the case 100. The fastening strap 216 of the second flap 112 includes, forms, and/or otherwise provides either a loop component or a hook component of a hook and loop fastener. In the illustrated example of FIGS. 1-8, the fastening strap 216 is located proximate the cutout 140 formed along the second edge 136 of the second flap 112. In other examples, the fastening strap 216 of the second flap 112 can be positioned at a different location on the second side 202 of the case 100. In some examples, the fastening strap 216 of the second flap 112 is foldable back on itself such that a fastening element (e.g., a hook component or a loop component) of the fastening strap 216 is covered and/or not exposed when the case 100 is in the open configuration 102 shown in FIGS. 1-8. In the illustrated example of FIGS. 1-8, the fastening strap 216 of the second flap 112 has a rectangular shape. In other examples, the fastening strap 216 of the second flap 112 can have a shape that differs from the rectangular shape shown in FIGS. 1-8.

In the illustrated example of FIGS. 1-8, the fastening strap 210 of the first flap 110 and the fastening strap 216 of the second flap 112 are individually and/or collectively configured to be removably coupled and/or removably joined to one another in the form of a first hook and loop fastener. For example, the fastening strap 210 of the first flap 110 can be configured to include, form, and/or provide a hook component of the first hook and loop fastener, and the fastening strap 216 of the second flap 112 can be configured to include, form, and/or provide a loop component of the first hook and loop fastener. As another example, the fastening strap 210 of the first flap 110 can be configured to include, form, and/or provide a loop component of the first hook and loop fastener, and the fastening strap 216 of the second flap 112 can be configured to include, form, and/or provide a hook component of the first hook and loop fastener. In such examples, the fastening strap 210 of the first flap 110 can be coupled and/or joined to the fastening strap 216 of the second flap 112 when the case 100 of FIGS. 1-8 is positioned in a closed configuration, as further described below.

The third flap 114 of the case 100 of FIGS. 1-8 further includes an example fastening strip 174 coupled (e.g., sewn, stitched, and/or otherwise affixed) to the first side 104 of the case 100. The fastening strip 174 of the third flap 114 includes, forms, and/or otherwise provides either a loop component or a hook component of a hook and loop fastener. In the illustrated example of FIGS. 1-8, the fastening strip 174 is located adjacent the first edge 142, the second edge 144, and the third edge 146 of the third flap 114, with the fastening strip 174 extending along the first edge 142 of the third flap 114 from the second edge 144 of the third flap 114 to and/or towards the third edge 146 of the third flap 114. In other examples, the fastening strip 174 of the third flap 114 can be positioned at a different location on the first side 104 of the case 100. In the illustrated example of FIGS. 1-8, the fastening strip 174 of the third flap 114 has a rectangular shape. In other examples, the fastening strip 174 of the third flap 114 can have a shape that differs from the rectangular shape shown in FIGS. 1-8.

In the illustrated example of FIGS. 1-8, the fastening strip 174 of the third flap 114, the fastening strip 206 of the first flap 110, and the fastening strip 212 of the second flap 112 are individually and/or collectively configured to be removably coupled and/or removably joined to one another in the form of a second hook and loop fastener. For example, the fastening strip 174 of the third flap 114 can be configured to include, form, and/or provide a hook component of the second hook and loop fastener, and the fastening strip 206 of the first flap 110 and/or the fastening strip 212 of the second flap 112 can be individually or collectively configured to include, form, and/or provide a loop component of the second hook and loop fastener. As another example, the fastening strip 174 of the third flap 114 can be configured to include, form, and/or provide a loop component of the second hook and loop fastener, and the fastening strip 206 of the first flap 110 and/or the fastening strip 212 of the second flap 112 can be individually or collectively configured to include, form, and/or provide a hook component of the second hook and loop fastener. In such examples, the fastening strip 174 of the third flap 114 can be coupled and/or joined to the fastening strip 206 of the first flap 110 and/or the fastening strip 212 of the second flap 112 when the case 100 of FIGS. 1-8 is positioned in a closed configuration, as further described below.

The fourth flap 116 of the case 100 of FIGS. 1-8 further includes example fastening tabs 176 respectively coupled (e.g., sewn, stitched, and/or otherwise affixed) to the first side 104 of the case 100. The fastening tabs 176 of the fourth flap 116 respectively include, form, and/or otherwise provide either a loop component or a hook component of a hook and loop fastener. In the illustrated example of FIGS. 1-8, the fastening tabs 176 are respectively located adjacent an example free end 178 of the closure tab 154 of the fourth flap 116. In other examples, the fastening tabs 176 of the fourth flap 116 can be positioned at a different location on the first side 104 of the case 100. In the illustrated example of FIGS. 1-8, the fastening tabs 176 of the fourth flap 116 has a rectangular shape. In other examples, the fastening tabs 176 of the fourth flap 116 can have a shape that differs from the rectangular shape shown in FIGS. 1-8.

In the illustrated example of FIGS. 1-8, the fastening tabs 176 of the fourth flap 116, the fastening tab 208 of the first flap 110, and the fastening tab 214 of the second flap 112 are individually and/or collectively configured to be removably coupled and/or removably joined to one another in the form of a third hook and loop fastener. For example, the fastening tabs 176 of the fourth flap 116 can be individually or collectively configured to include, form, and/or provide a hook component of the third hook and loop fastener, and the fastening tab 208 of the first flap 110 and/or the fastening tab 214 of the second flap 112 can be individually or collectively configured to include, form, and/or provide a loop component of the third hook and loop fastener. As another example, the fastening tabs 176 of the fourth flap 116 can be individually or collectively configured to include, form, and/or provide a loop component of the third hook and loop fastener, and the fastening tab 208 of the first flap 110 and/or the fastening tab 214 of the second flap 112 can be individually or collectively configured to include, form, and/or provide a hook component of the third hook and loop fastener. In such examples, the fastening tabs 176 of the fourth flap 116 can be coupled and/or joined to the fastening tab 208 of the first flap 110 and/or the fastening tab 214 of the second flap 112 when the case 100 of FIGS. 1-8 is positioned in a closed configuration, as further described below.

The fourth flap 116 of the case 100 of FIGS. 1-8 further includes an example pocket 218 coupled (e.g., sewn, stitched, and/or otherwise affixed) to the second side 202 of the case 100. The pocket 218 of the fourth flap 116 is configured to receive various accessories associated with the case 100, and/or associated with a portable grill to be loaded into, transported within, and/or stored within the case 100. For example, the pocket 218 is configured to receive an instruction manual associated with the case 100, an instruction manual associated with the portable grill, and/or one or more cooking utensil(s) to be used in connection with the portable grill. In this regard, the pocket 218 of the fourth flap 116 includes an opening along one or more edges of the pocket 218, with the opening configured to enable the aforementioned accessories to be placed into and/or removed from the pocket 218. In the illustrated example of FIGS. 1-8, the pocket 218 of the fourth flap 116 has a rectangular shape. In other examples, the pocket 218 of the fourth flap 116 can have a shape that differs from the rectangular shape shown in FIGS. 1-8.

Figure 12:
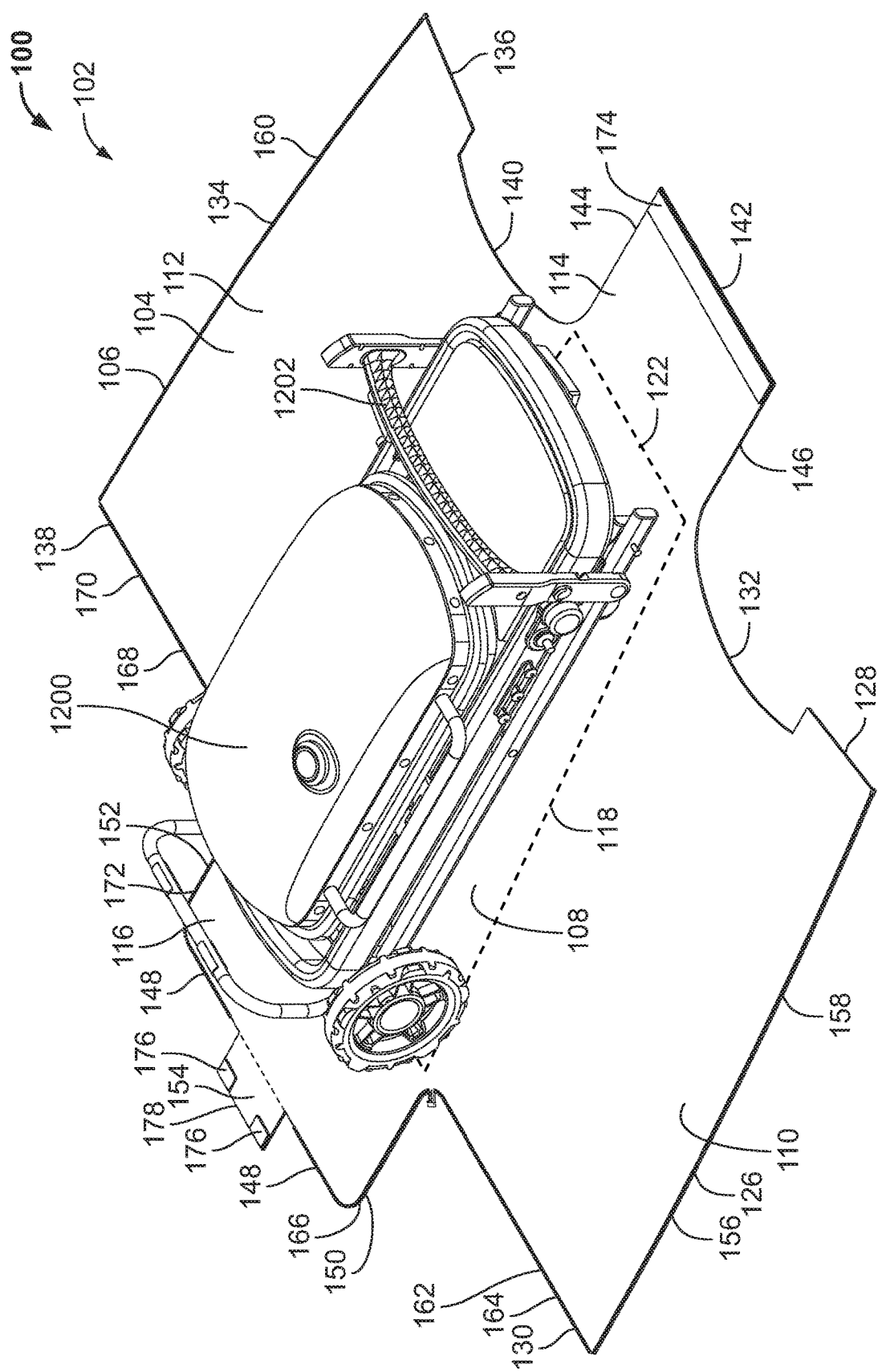
FIG. 12 is a third perspective view of the case of FIGS. 1-8, with the case shown positioned in the open configuration of FIGS. 1-8, and with an example portable grill shown loaded onto the case.

FIG. 12 is a third perspective view of the case 100 of FIGS. 1-8, with the case 100 shown positioned in the open configuration 102 of FIGS. 1-8, and with an example portable grill 1200 shown loaded onto the case 100. In the illustrated example of FIG. 12, the portable grill 1200 is placed on the first side 104 of the case 100, with the portable grill 1200 being located on the base 108 of the case 100, and with the portable grill 1200 filling and/or covering the substantial entirety of the base 108. As shown in FIG. 12, the portable grill 1200 is positioned in a collapsed configuration that facilitates transporting and/or storing the portable grill 1200 from one location to another. The portable grill 1200 of FIG. 12 includes an example handle 1202. In the illustrated example of FIG. 12, the handle 1202 extends in a direction that is generally perpendicular relative to the base 108 of the case 100. In other examples, the handle 1202 can alternatively extend in a direction that is not perpendicular to the base 108 of the case 100. In still other examples, the handle 1202 can alternatively extend in a direction that is generally parallel to the base 108 of the case 100.

Figure 13:
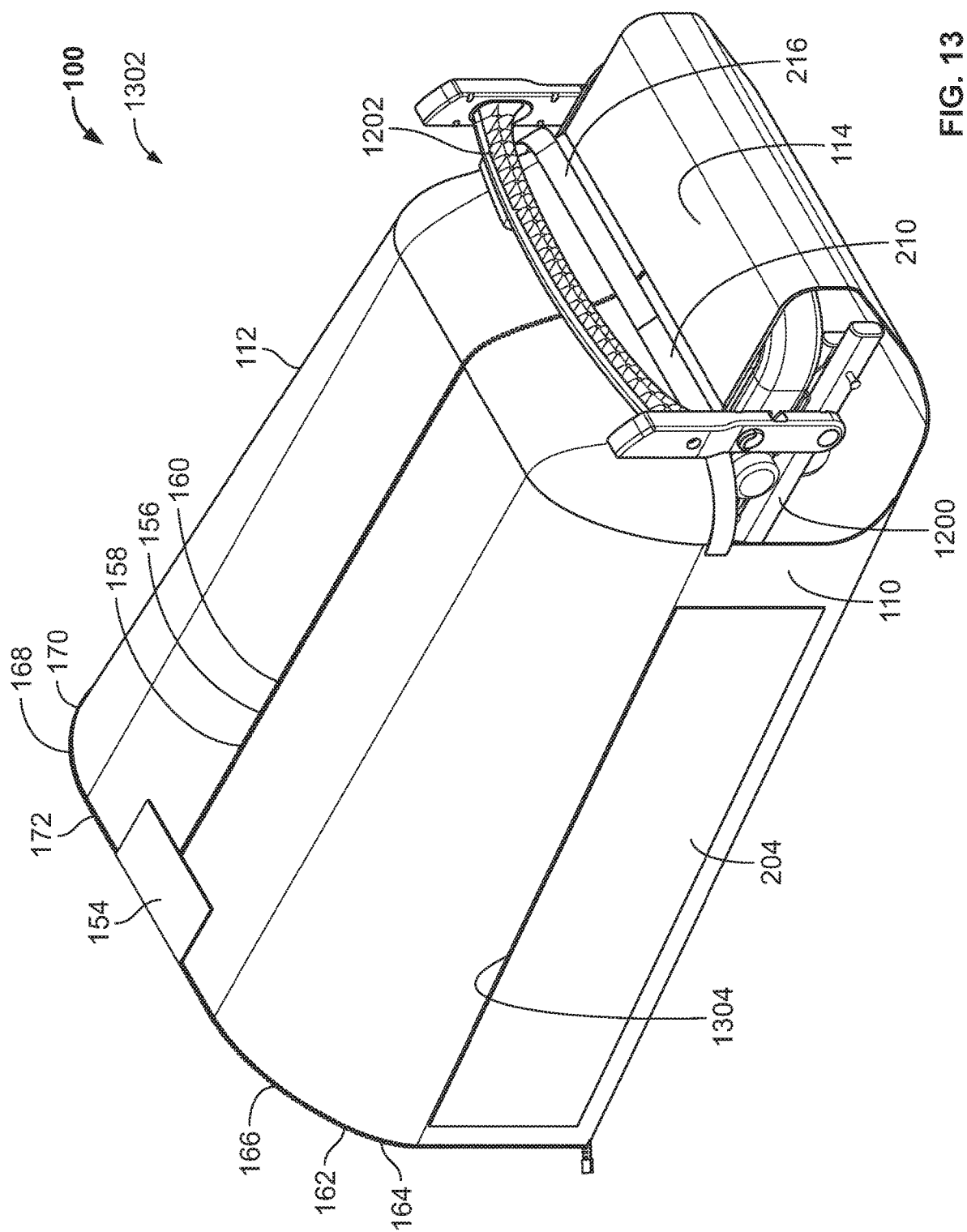
FIG. 13 is a perspective view of the case of FIGS. 1-8 and 12, with the case shown positioned in an example closed configuration, and with the portable grill of FIG. 12 shown loaded within the case.
Figure 14:
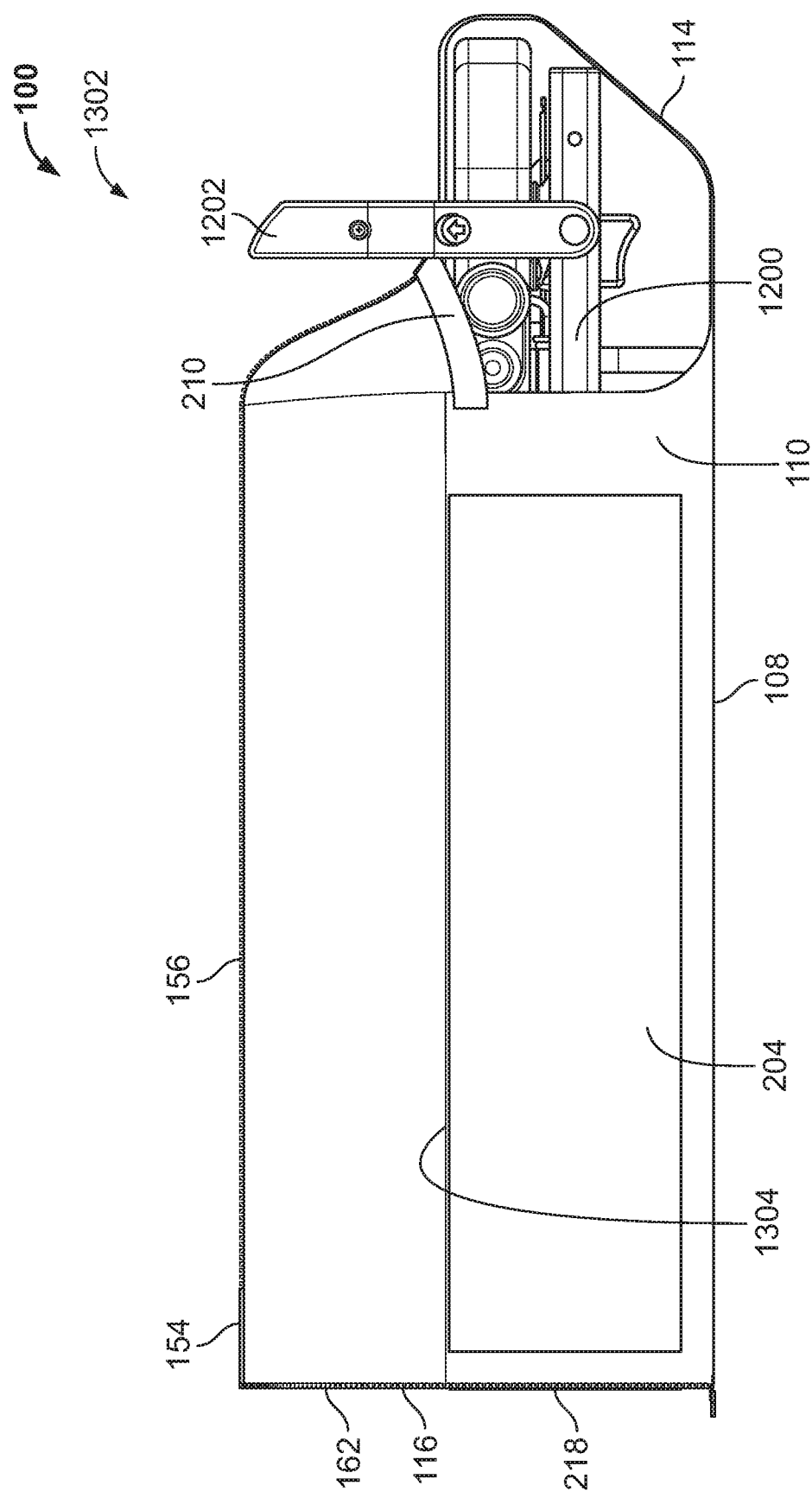
FIG. 14 is a front view of the case of FIGS. 1-8, 12, and 13, with the case shown positioned in the closed configuration of FIG. 13, and with the portable grill of FIG. 12 shown loaded within the case.
Figure 15:
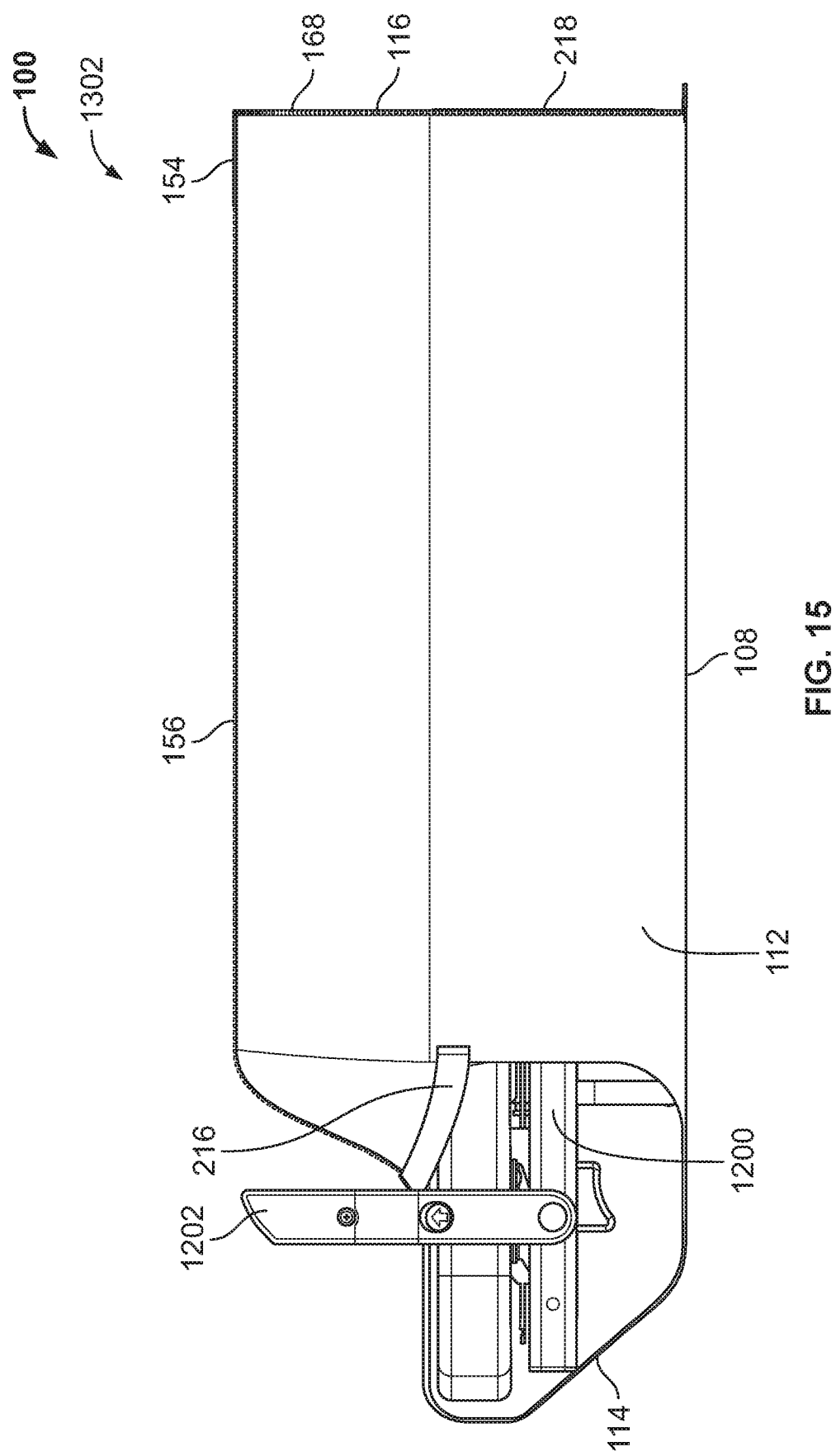
FIG. 15 is a rear view of the case of FIGS. 1-8 and 12-14, with the case shown positioned in the closed configuration of FIGS. 13 and 14, and with the portable grill of FIG. 12 shown loaded within the case.
Figure 16:
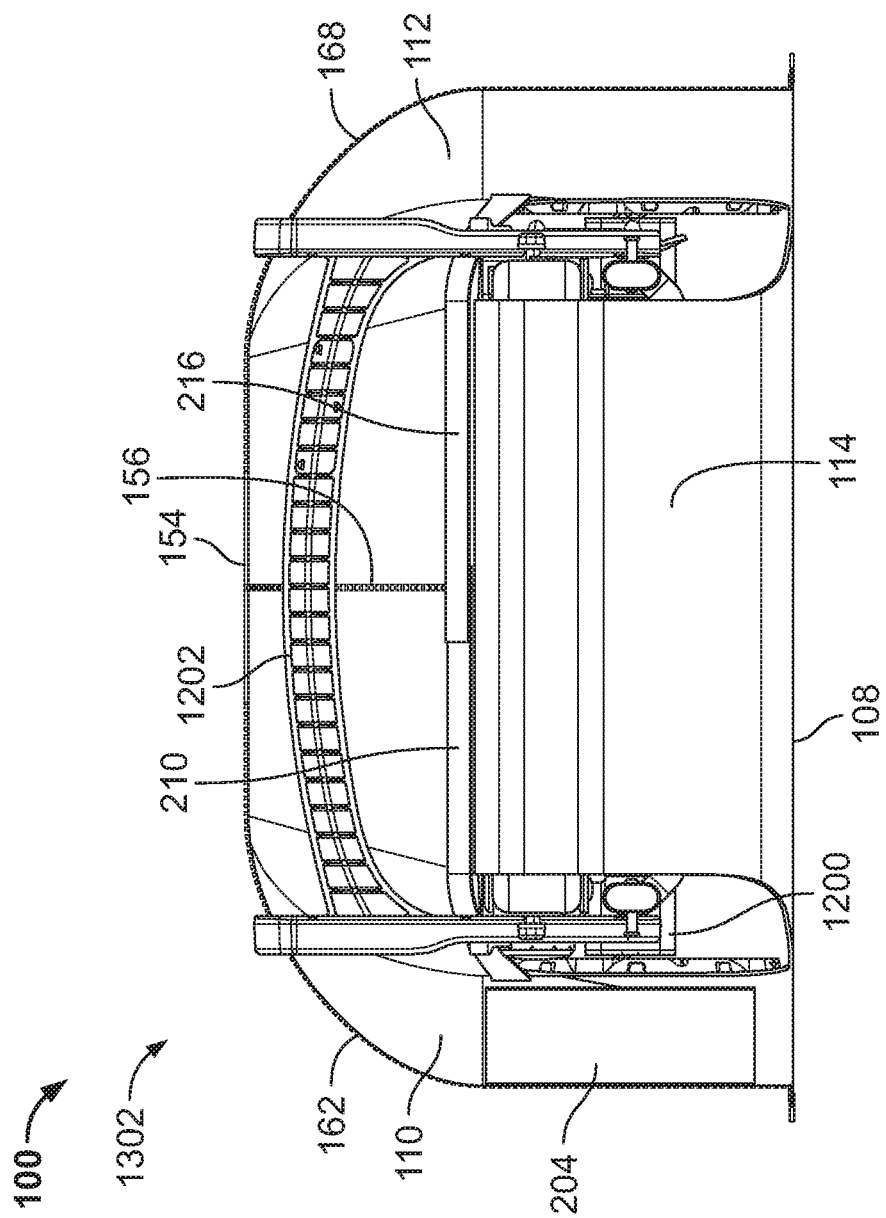
FIG. 16 is a right side view of the case of FIGS. 1-8 and 12-15, with the case shown positioned in the closed configuration of FIGS. 13-15, and with the portable grill of FIG. 12 shown loaded within the case.
Figure 17:
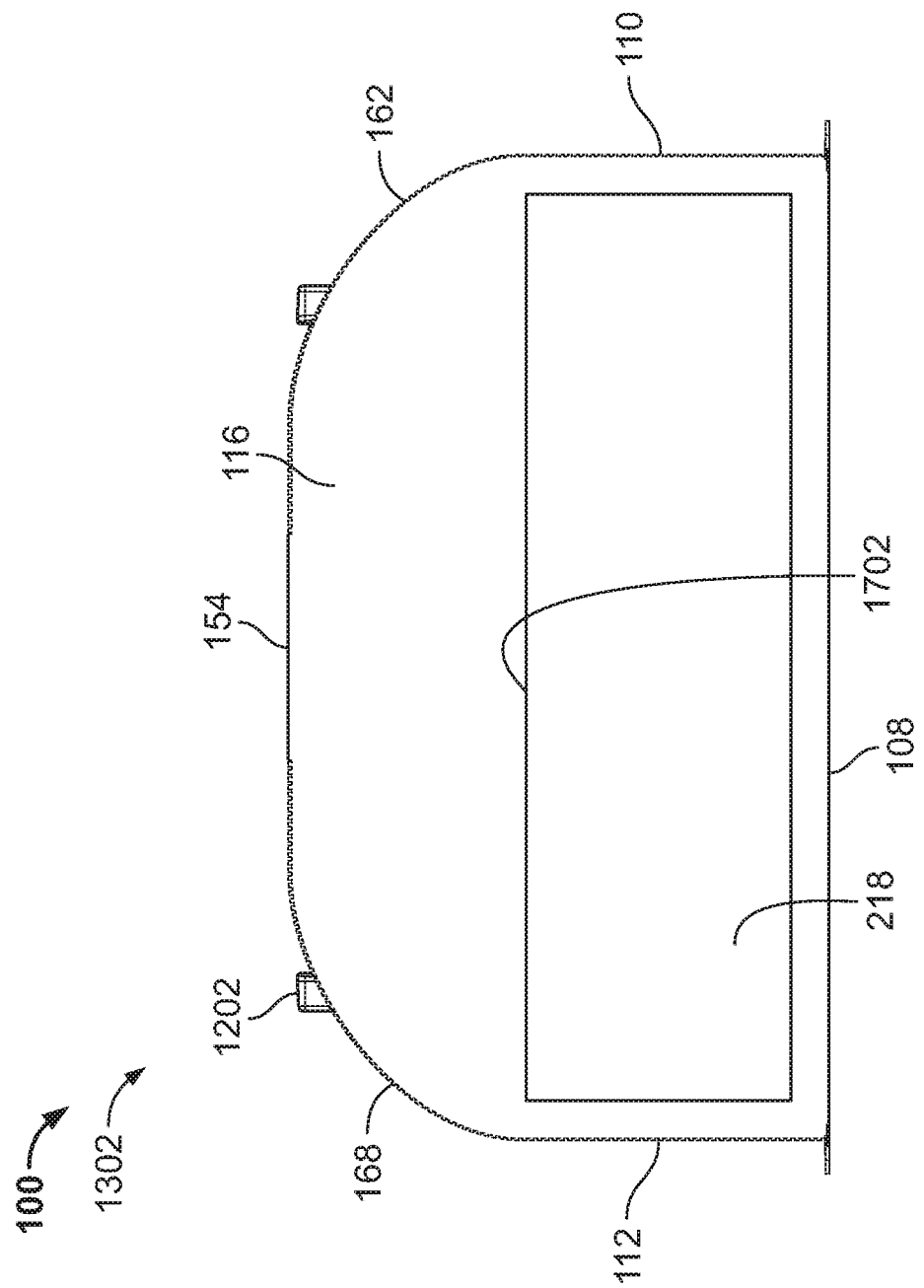
FIG. 17 is a left side view of the case of FIGS. 1-8 and 12-16, with the case shown positioned in the closed configuration of FIGS. 13-16, and with the portable grill of FIG. 12 shown loaded within the case.
Figure 18:
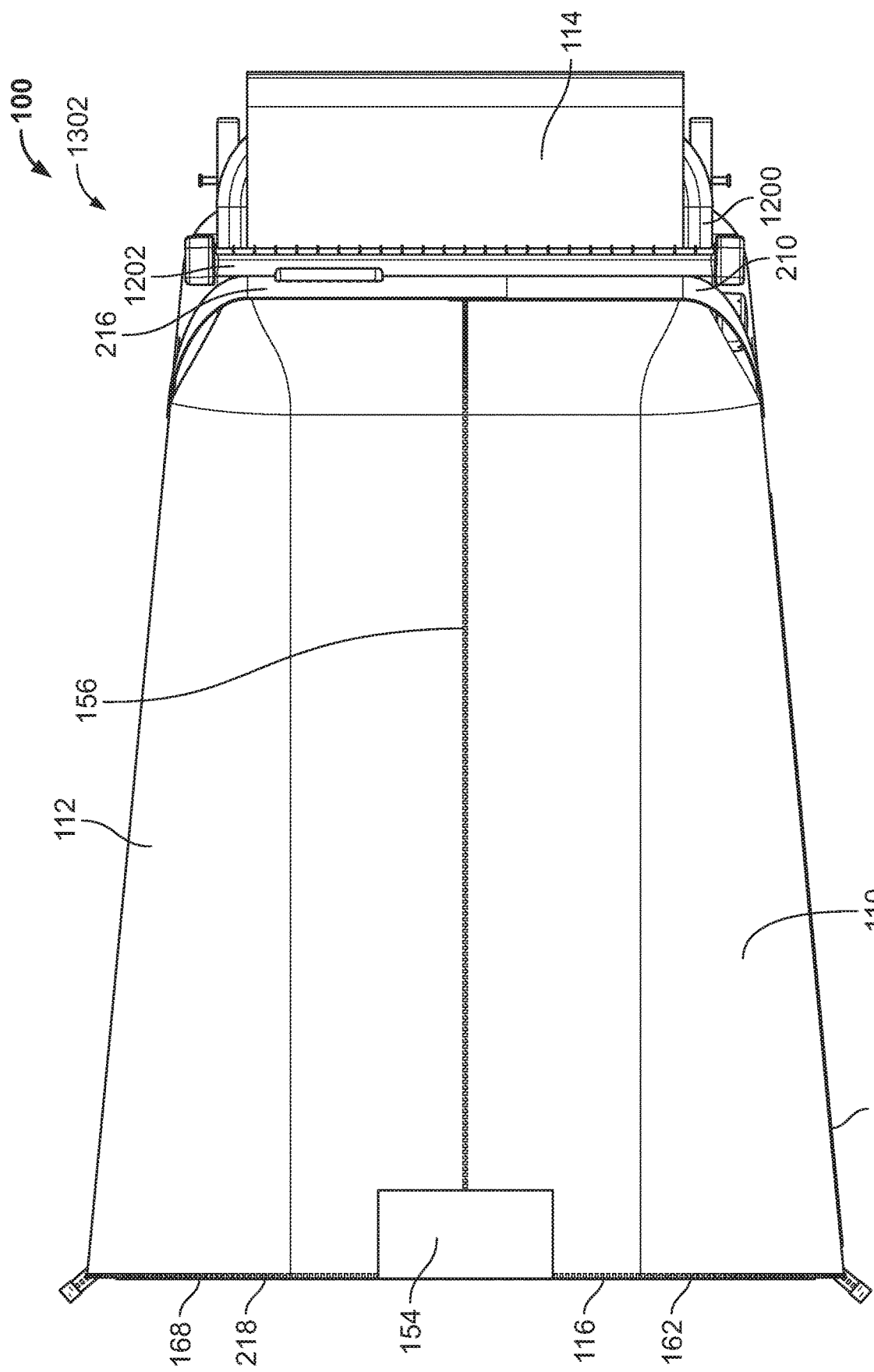
FIG. 18 is a top view of the case of FIGS. 1-8 and 12-16, with the case shown positioned in the closed configuration of FIGS. 13-17, and with the portable grill of FIG. 12 shown loaded within the case.
Figure 19:
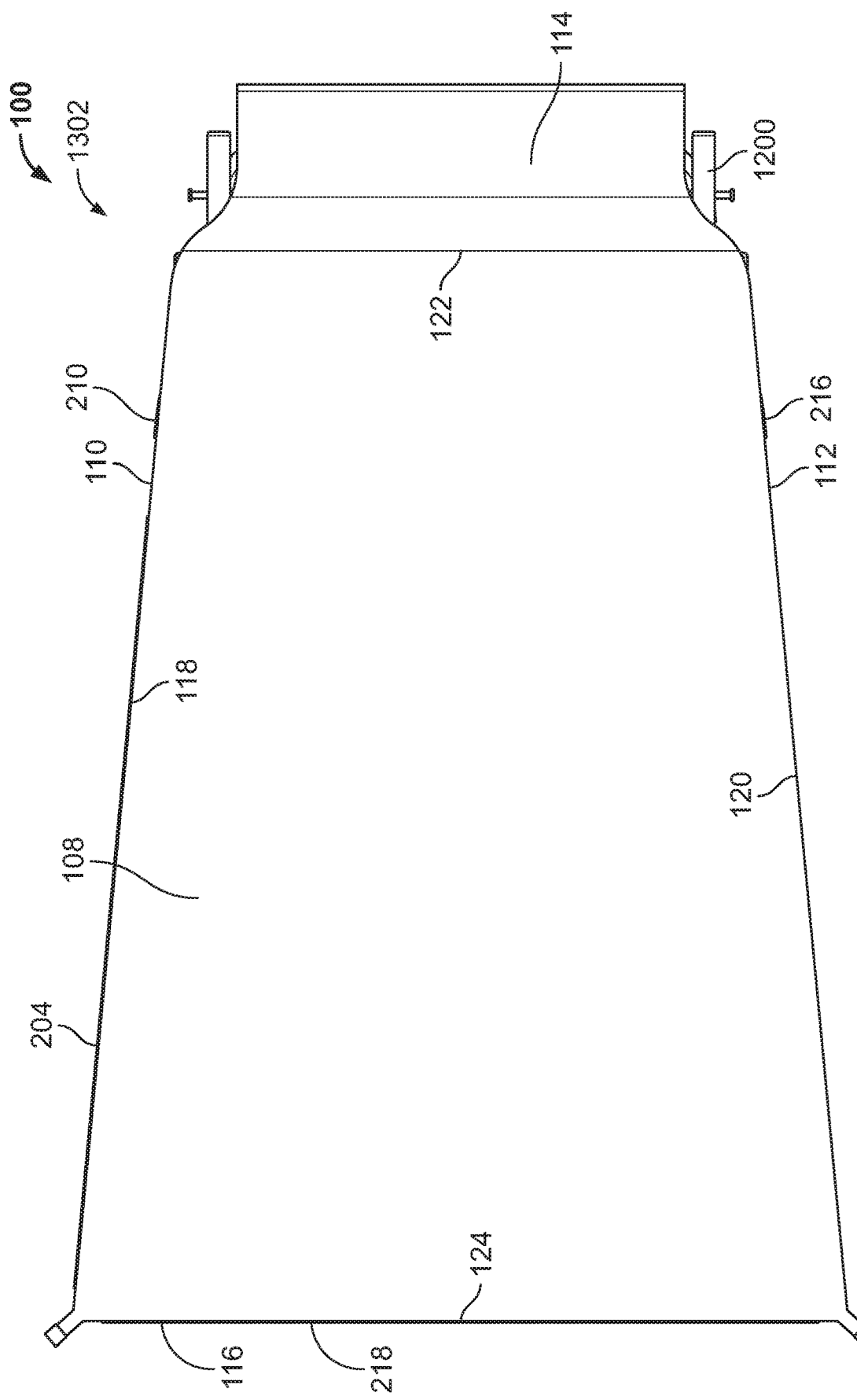
FIG. 19 is a bottom view of the case of FIGS. 1-8 and 12-17, with the case shown positioned in the closed configuration of FIGS. 13-18, and with the portable grill of FIG. 12 shown loaded within the case.

The case 100 of FIGS. 1-8 and 12 can be transitioned from the open configuration 102 shown in FIGS. 1-8 and 12 into an example closed configuration 1302 shown in FIGS. 13-19, and vice-versa. FIG. 13 is a perspective view of the case 100, with the case 100 shown positioned in the closed configuration 1302, and with the portable grill 1200 shown loaded within the case 100. FIG. 14 is a front view of the case 100, with the case 100 shown positioned in the closed configuration 1302, and with the portable grill 1200 of FIG. 12 shown loaded within the case 100. FIG. 15 is a rear view of the case 100, with the case 100 shown positioned in the closed configuration 1302, and with the portable grill 1200 of FIG. 12 shown loaded within the case 100. FIG. 16 is a right side view of the case 100, with the case 100 shown positioned in the closed configuration 1302, and with the portable grill 1200 shown loaded within the case 100. FIG. 17 is a left side view of the case 100, with the case 100 shown positioned in the closed configuration 1302, and with the portable grill 1200 shown loaded within the case 100. FIG. 18 is a top view of the case 100, with the case 100 shown positioned in the closed configuration 1302, and with the portable grill 1200 shown loaded within the case 100. FIG. 19 is a bottom view of the case 100, with the case 100 shown positioned in the closed configuration 1302, and with the portable grill 1200 shown loaded within the case 100.

The case 100 is configured to be positioned in the closed configuration 1302 shown in FIGS. 13-19 subsequent to a portable grill (e.g., the portable grill 1200 of FIG. 12) being loaded onto or into the case 100, and/or prior to a portable grill (e.g., the portable grill 1200 of FIG. 12) being unloaded from the case 100. When the case 100 is positioned in the closed configuration 1302 shown in FIGS. 13-19, the first flap 110, the second flap 112, the third flap 114, and the fourth flap 116 of the case 100 respectively extend upwardly from the base 108 of the case 100. In this regard, the first flap 110 covers a side portion (e.g., a front portion) and a top portion of the portable grill 1200 when the case 100 is in the closed configuration 1302 shown in FIGS. 13-19. The second flap 112 covers a side portion (e.g., a rear portion) and a top portion of the portable grill 1200 when the case 100 is in the closed configuration 1302 shown in FIGS. 13-19. The third flap 114 covers a side portion (e.g., a right side portion) and a top portion of the portable grill 1200 when the case 100 is in the closed configuration 1302 shown in FIGS. 13-19. The fourth flap 116 covers a side portion (e.g., a left side portion) and a top portion of the portable grill 1200 when the case 100 is in the closed configuration 1302 shown in FIGS. 13-19.

In the illustrated example of FIGS. 13-19, the pocket 204 of the first flap 110 includes an example opening 1304 formed along an upper edge of the pocket 204. In other examples, the opening 1304 of the pocket 204 of the first flap 110 can alternatively be formed along a different edge of the pocket 204. In some examples, the opening 1304 of the pocket 204 of the first flap 110 can be selectively closed via a fastener (e.g., a zipper, a hook and loop fastener, etc.) running along the edge of the pocket 204 at which the opening 1304 is formed.

In the illustrated example of FIGS. 13-19, the pocket 218 of the fourth flap 116 includes an example opening 1702 formed along an upper edge of the pocket 218. In other examples, the opening 1702 of the pocket 218 of the fourth flap 116 can alternatively be formed along a different edge of the pocket 218. In some examples, the opening 1702 of the pocket 218 of the fourth flap 116 can be selectively closed via a fastener (e.g., a zipper, a hook and loop fastener, etc.) running along the edge of the pocket 218 at which the opening 1702 is formed.

When the case 100 of FIGS. 1-8 and 12-19 is positioned in the closed configuration 1302 shown in FIGS. 13-19, one or more of the above-described zippers of the case 100 is/are in a fastened state that assists in maintaining the case 100 in the closed configuration 1302. For example, the first set of teeth 158 of the first zipper 156 is attached, joined, and/or fastened to the second set of teeth 160 of the first zipper 156 when the case 100 is positioned in the closed configuration 1302 of FIGS. 13-19. As another example, the first set of teeth 164 of the second zipper 162 is attached, joined, and/or fastened to the second set of teeth 166 of the second zipper 162 when the case 100 is positioned in the closed configuration 1302 of FIGS. 13-19. As another example, the first set of teeth 170 of the third zipper 168 is attached, joined, and/or fastened to the second set of teeth 172 of the third zipper 168 when the case 100 is positioned in the closed configuration 1302 of FIGS. 13-19.

When the case 100 of FIGS. 1-8 and 12-19 is positioned in the closed configuration 1302 shown in FIGS. 13-19, one or more of the above-described hook and loop fasteners of the case 100 is/are in a fastened state that assists in maintaining the case 100 in the closed configuration 1302. For example, the fastening strap 210 of the first flap 110 is attached, joined, and/or fastened (e.g., via a hook and loop interface) to the fastening strap 216 of the second flap 112 when the case 100 is positioned in the closed configuration 1302 of FIGS. 13-19. As another example, the fastening strip 174 of the third flap 114 is attached, joined, and/or fastened (e.g., via a hook and loop interface) to the fastening strip 206 of the first flap 110 and/or the fastening strip 212 of the second flap 112 when the case 100 is positioned in the closed configuration 1302 of FIGS. 13-19. As another example, the fastening tabs 176 of the fourth flap 116 are attached, joined, and/or fastened (e.g., via a hook and loop interface) to the fastening tab 208 of the first flap 110 and/or the fastening tab 214 of the second flap 112 when the case 100 is positioned in the closed configuration 1302 of FIGS. 13-19.

When the case 100 of FIGS. 1-8 and 12-19 is positioned in the closed configuration 1302 shown in FIGS. 13-19, the case 100 surrounds and/or encases the overwhelming majority of the portable grill 1200, with only the handle 1202 of the portable grill 1200 extending outside of the case 100. In such examples, the case 100 and/or the portable grill 1200 are specifically configured to have the handle 1202 of the portable grill 1200 extending outside of the case 100. It such examples, the exposed handle 1202 of the portable grill 1200 can advantageously be grasped and/or gripped by a user to better facilitate moving the portable grill 1200 while the portable grill 1200 remains loaded within the case 100. In other examples, the case 100 can alternatively surround and/or encase the entirety of the portable grill 1200, including the handle 1202 thereof.

Figure 20:
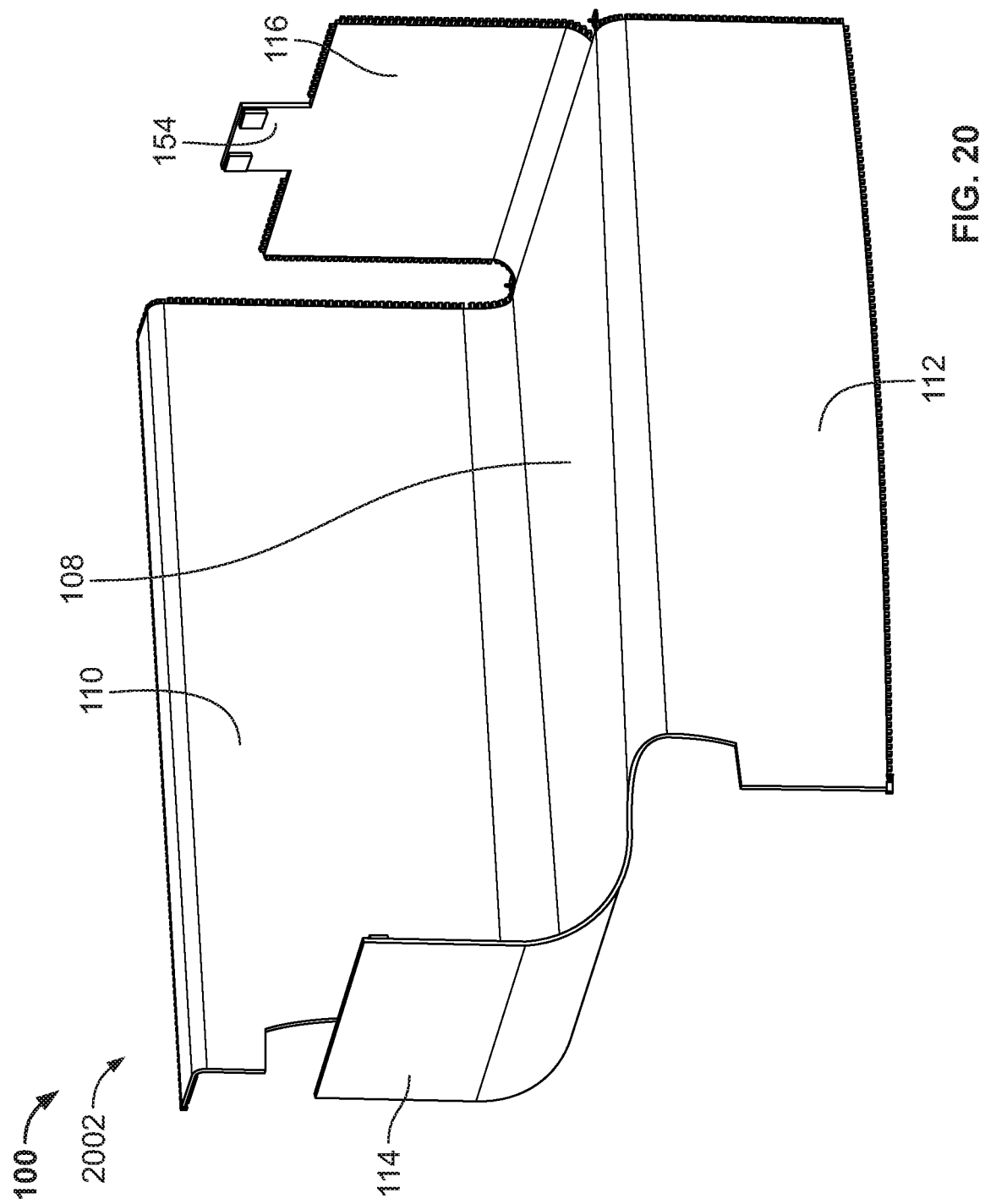
FIG. 20 is a perspective view of the case of FIGS. 1-8 and 12-19, with the case shown positioned in an example vehicle loading configuration.

The case 100 of FIGS. 1-8 and 12-19 can advantageously be transitioned from the open configuration 102 shown in FIGS. 1-8 and 12, or from the closed configuration 1302 shown in FIGS. 13-19, into an example vehicle loading configuration 2002 shown in FIG. 20, and vice-versa. FIG. 20 is a perspective view of the case 100 of FIGS. 1-8 and 12-19, with the case 100 shown positioned in the vehicle loading configuration 2002. The case 100 is configured to be positioned in the vehicle loading configuration 2002 shown in FIG. 20 prior to or during a portable grill (e.g., the portable grill 1200 of FIG. 12) being loaded onto or into the case 100 while the case 100 is positioned within a trunk compartment of a vehicle (e.g., the trunk compartment 2102 of the vehicle 2100 of FIG. 21), and/or subsequent to or during a portable grill (e.g., the portable grill 1200 of FIG. 12) being unloaded from the case 100 while the case 100 is positioned within a trunk compartment of a vehicle (e.g., the trunk compartment 2102 of the vehicle 2100 of FIG. 21).

When the case 100 is positioned in the vehicle loading configuration 2002 shown in FIG. 20, the first flap 110, the third flap 114, and the fourth flap 116 of the case 100 respectively extend upwardly from the base 108 of the case 100, and the second flap 112 of the case 100 extends downwardly from the base 108 of the case 100. In this regard, when the case 100 is positioned in the vehicle loading configuration 2002 shown in FIG. 20, the base 108 is configured to cover and/or be positioned against an interior portion (e.g., a floor) of a trunk compartment of a vehicle, the first flap 110 is configured to cover and/or be positioned against an interior portion (e.g., a seat back) of the trunk compartment of the vehicle, the second flap 112 is configured to cover and/or be positioned against an exterior portion (e.g., a bumper) of the trunk compartment of the vehicle, the third flap 114 is configured to cover and/or be positioned against an interior portion (e.g., a left sidewall) of the trunk compartment of the vehicle, and the fourth flap 116 is configured to cover and/or be positioned against an interior portion (e.g., a right sidewall) of the trunk compartment of the vehicle.

The above-described arrangement of the base 108, the first flap 110, the second flap 112, the third flap 114, and the fourth flap 116 of the case 100 in connection with the vehicle loading configuration 2002 of FIG. 20 advantageously enables the case 100 to operate as a trunk protector for a trunk compartment of a vehicle. In this regard, the above-described arrangement of the base 108, the first flap 110, the second flap 112, the third flap 114, and the fourth flap 116 of the case 100 in connection with the vehicle loading configuration 2002 of FIG. 20 prevents dirt and/or residual cooking material (e.g., grease, ash, food byproducts, etc.) located on and/or within a portable grill from coming into contact with a trunk compartment of a vehicle when the portable grill is located on and/or within the case 100 while the case 100 is located within the trunk compartment.

In other examples, one or more aspect(s) of the above-described arrangement of the base 108, the first flap 110, the second flap 112, the third flap 114, and the fourth flap 116 of the case 100 can be reversed relative to the arrangement shown in connection with the vehicle loading configuration 2002 of FIG. 20. For example, the vehicle loading configuration 2002 shown in FIG. 20 can alternatively have the second flap 112, the third flap 114, and the fourth flap 116 of the case 100 respectively extending upwardly from the base 108 of the case 100, and the first flap 110 of the case 100 extending downwardly from the base 108 of the case 100. In such an alternate arrangement of the vehicle loading configuration 2002, the base 108 is configured to cover and/or be positioned against an interior portion (e.g., a floor) of a trunk compartment of a vehicle, the first flap 110 is configured to cover and/or be positioned against an exterior portion (e.g., a bumper) of the trunk compartment of the vehicle, the second flap 112 is configured to cover and/or be positioned against an interior portion (e.g., a seat back) of the trunk compartment of the vehicle, the third flap 114 is configured to cover and/or be positioned against an interior portion (e.g., a right sidewall) of the trunk compartment of the vehicle, and the fourth flap 116 is configured to cover and/or be positioned against an interior portion (e.g., a left sidewall) of the trunk compartment of the vehicle.

Figure 21:
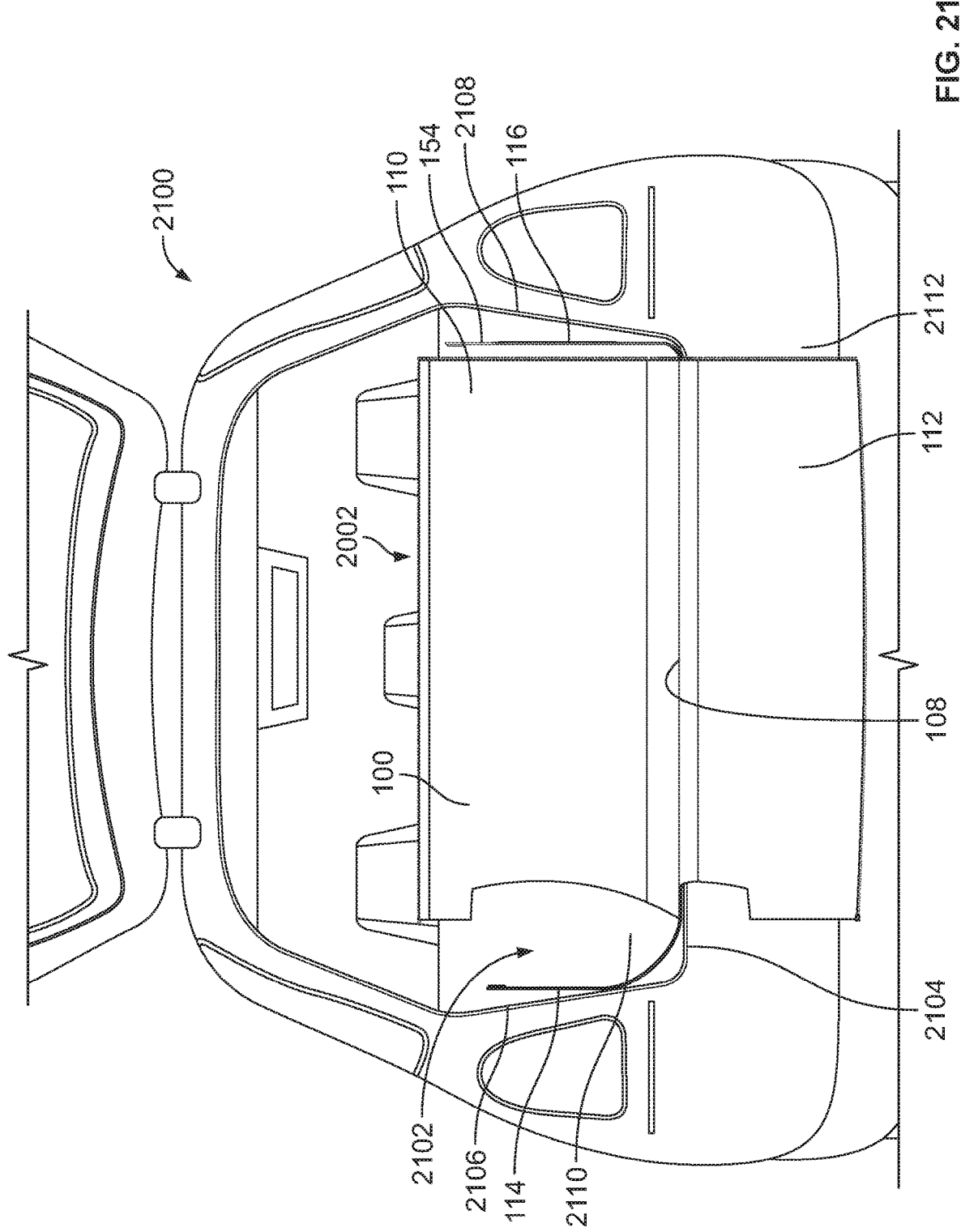
FIG. 21 is a rear view of an example vehicle, with the case of FIGS. 1-8 and 12-20 shown positioned in the vehicle loading configuration of FIG. 20 within an example trunk compartment of the vehicle.

FIG. 21 is a rear view of an example vehicle 2100, with the case 100 shown positioned in the vehicle loading configuration 2002 of FIG. 20 within an example trunk compartment 2102 of the vehicle 2100. In the illustrated example of FIG. 21, the trunk compartment 2102 of the vehicle 2100 includes and/or is defined by an example floor 2104, an example left sidewall 2106, an example right sidewall 2108, an example seat back 2110, and an example bumper 2112. When the case 100 is positioned in the vehicle loading configuration 2002 shown in FIGS. 20 and 21 within the trunk compartment 2102 of the vehicle 2100 of FIG. 21, the base 108 of the case 100 covers and/or is positioned adjacent the floor 2104 of the trunk compartment 2102, the first flap 110 of the case 100 covers and/or is positioned adjacent the seat back 2110 of the trunk compartment 2102, the second flap 112 of the case 100 covers and/or is positioned adjacent the bumper 2112 of the trunk compartment 2102, the third flap 114 of the case 100 covers and/or is positioned adjacent the left sidewall 2106 of the trunk compartment 2102, and the fourth flap 116 of the case 100 covers and/or is positioned adjacent the right sidewall 2108 of the trunk compartment 2102. The above-described arrangement of the base 108, the first flap 110, the second flap 112, the third flap 114, and the fourth flap 116 of the case 100 advantageously enables the case 100 to operate as a trunk protector for the trunk compartment 2102 of the vehicle 2100. In this regard, the above-described arrangement of the base 108, the first flap 110, the second flap 112, the third flap 114, and the fourth flap 116 of the case 100 prevents dirt and/or residual cooking material (e.g., grease, ash, food byproducts, etc.) located on and/or within a portable grill from coming into contact with the trunk compartment 2102 of the vehicle 2100 when the portable grill is located on and/or within the case 100 while the case 100 is located within the trunk compartment 2102.

Figure 22:
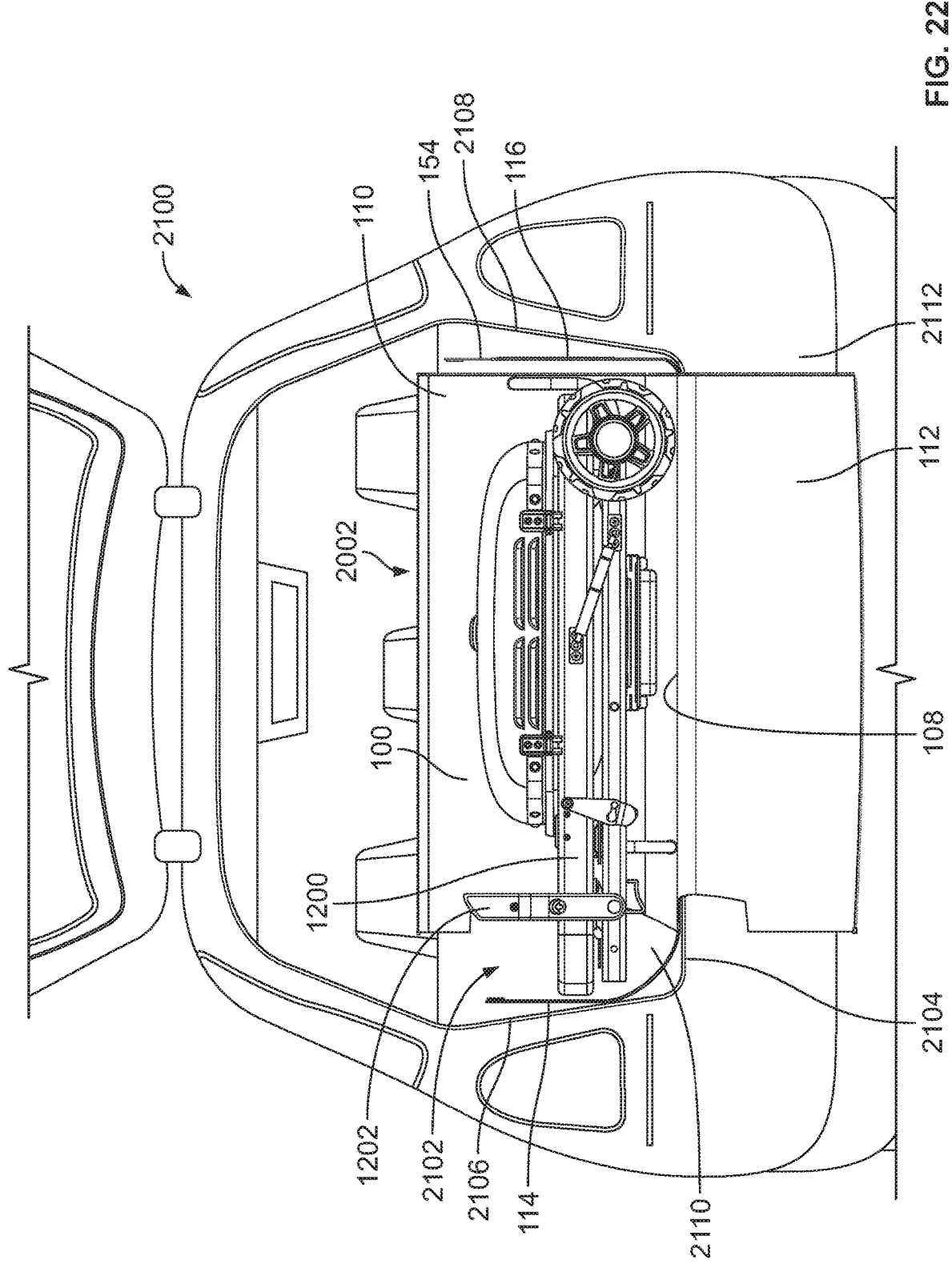
FIG. 22 is a rear view of the vehicle of FIG. 21, with the case of FIGS. 1-8 and 12-21 shown positioned in the vehicle loading configuration of FIGS. 20 and 21 within the trunk compartment of the vehicle, and with the portable grill of FIGS. 12-19 shown loaded onto the case.

FIG. 22 is a rear view of the vehicle 2100, with the case 100 shown positioned in the vehicle loading configuration 2002 of FIGS. 20 and 21 within the trunk compartment 2102 of the vehicle 2100, and with the portable grill 1200 of FIGS. 12-19 shown loaded onto the case 100. When the case 100 is positioned in the vehicle loading configuration 2002 shown in FIGS. 20-22 within the trunk compartment 2102 of the vehicle 2100 of FIGS. 21 and 22 with the portable grill 1200 loaded onto the case 100, the base 108 of the case 100 is positioned between a bottom of the portable grill 1200 and the floor 2104 of the trunk compartment 2102, the first flap 110 of the case 100 is positioned between a first side of the portable grill 1200 and the seat back 2110 of the trunk compartment 2102, the third flap 114 of the case 100 is positioned between a second side of the portable grill 1200 and the left sidewall 2106 of the trunk compartment 2102, and the fourth flap 116 of the case 100 is positioned between a third side of the portable grill 1200 and the right sidewall 2108 of the trunk compartment 2102. The above-described arrangement of the base 108, the first flap 110, the second flap 112, the third flap 114, and the fourth flap 116 of the case 100 advantageously enables the case 100 to operate as a trunk protector for the trunk compartment 2102 of the vehicle 2100. In this regard, the above-described arrangement of the base 108, the first flap 110, the second flap 112, the third flap 114, and the fourth flap 116 of the case 100 prevents dirt and/or residual cooking material (e.g., grease, ash, food byproducts, etc.) located on and/or within the portable grill 1200 of FIGS. 12-19 and 22 from coming into contact with the trunk compartment 2102 of the vehicle 2100 when the portable grill 1200 is loaded onto the case 100 while the case 100 is located within the trunk compartment 2102, as generally shown in FIG. 22.

Figure 23:
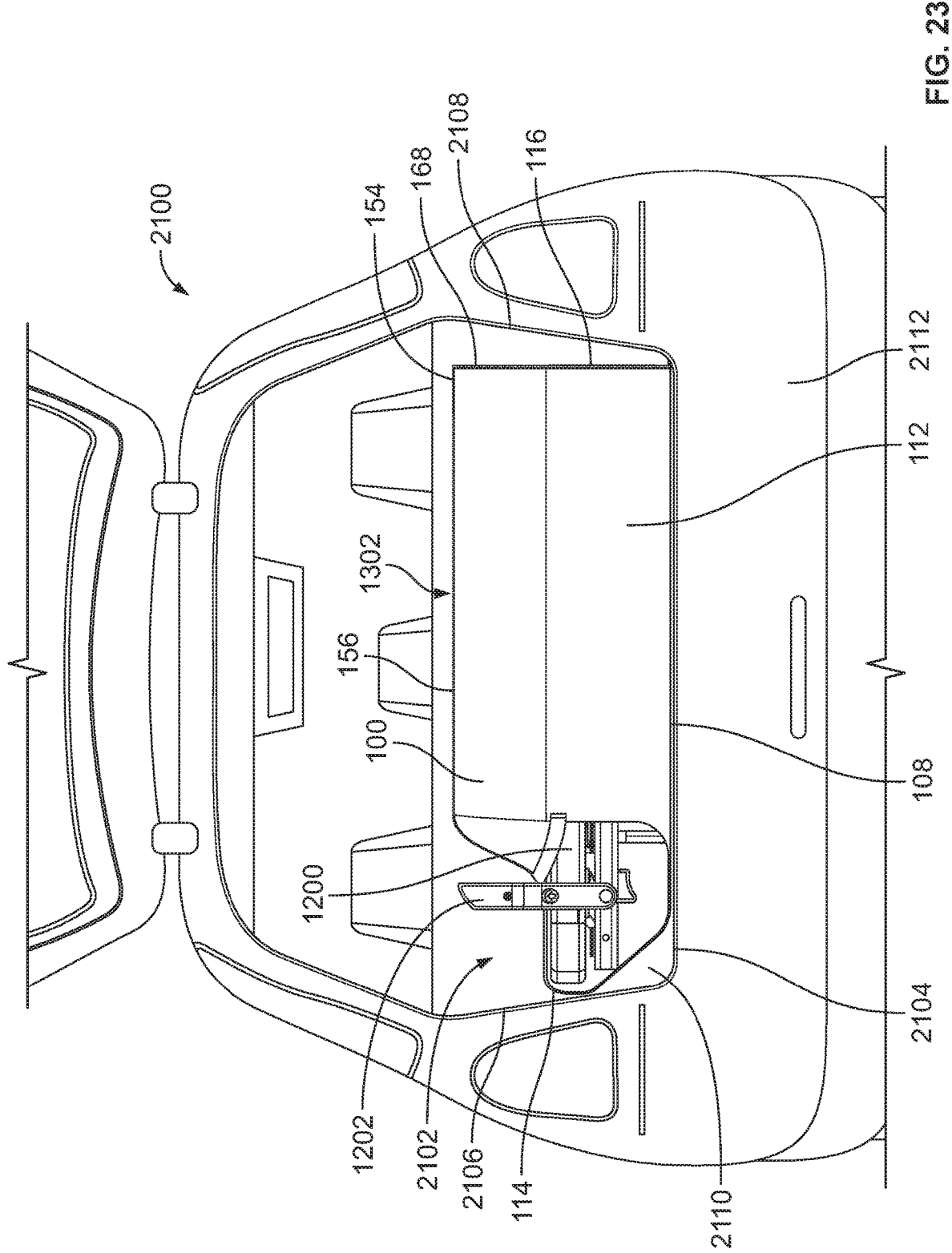
FIG. 23 is a rear view of the vehicle of FIGS. 21 and 22, with the case of FIGS. 1-8 and 12-22 shown positioned in the closed configuration of FIGS. 13-19 within the trunk compartment of the vehicle, and with the portable grill of FIGS. 12-19 and 22 shown loaded within the case.

FIG. 23 is a rear view of the vehicle 2100, with the case 100 shown positioned in the closed configuration 1302 of FIGS. 13-19 within the trunk compartment 2102 of the vehicle 2100, and with the portable grill 1200 of FIGS. 12-19 and 22 shown loaded within the case 100. When the case 100 is positioned in the closed configuration 1302 shown in FIGS. 13-19 and 23 within the trunk compartment 2102 of the vehicle 2100 of FIGS. 21-23 with the portable grill 1200 loaded within the case 100, the base 108 of the case 100 covers a bottom of the portable grill 1200, the first flap 110 of the case 100 covers a first side portion and a first top portion of the portable grill 1200, The second flap 112 of the case 100 covers a second side portion and a second top portion of the portable grill 1200, the third flap 114 of the case 100 covers a third portion and a third top portion of the portable grill 1200, and the fourth flap 116 of the case 100 covers a fourth side portion and a fourth top portion of the portable grill 1200. The above-described arrangement of the base 108, the first flap 110, the second flap 112, the third flap 114, and the fourth flap 116 of the case 100 advantageously enables the case 100 to operate as a trunk protector for the trunk compartment 2102 of the vehicle 2100. In this regard, the above-described arrangement of the base 108, the first flap 110, the second flap 112, the third flap 114, and the fourth flap 116 of the case 100 prevents dirt and/or residual cooking material (e.g., grease, ash, food byproducts, etc.) located on and/or within the portable grill 1200 of FIGS. 12-19, 22, and 23 from coming into contact with the trunk compartment 2102 of the vehicle 2100 when the portable grill 1200 is loaded within the case 100 while the case 100 is located within the trunk compartment 2102, as generally shown in FIG. 23.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A case for a portable grill, the case comprising:
a base;
a first flap extending from the base, the first flap including a first cutout;
a second flap extending from the base, the second flap including a second cutout;
a third flap extending from the base; and
a fourth flap extending from the base, the base being centrally located relative to the first flap, the second flap, the third flap, and the fourth flap, wherein the case is configured to be positioned in an open configuration in which the first flap extends radially away from the base in a first direction, the second flap extends radially away from the base in a second direction that differs from the first direction, the third flap extends radially away from the base in a third direction that differs from the first and second directions, and the fourth flap extends radially away from the base in a fourth direction that differs from the first, second, and third directions, and the fourth flap, and wherein the case is further configured to be positioned in a closed configuration in which the first flap, the second flap, the third flap, and the fourth flap respectively extend upwardly from the base, the first cutout and the second cutout to enable a handle of the portable grill to extend therefrom when the case is in the closed configuration.

2. The case of claim 1, wherein the first direction is generally opposite the second direction, and the third direction is generally opposite the fourth direction.

3. The case of claim 2, wherein the first direction is generally orthogonal to the third direction.

4. The case of claim 1, further comprising a first zipper, the first zipper including:
a first set of teeth coupled to and extending along an edge of the first flap; and
a second set of teeth coupled to and extending along an edge of the second flap, wherein the first set of teeth of the first zipper is separated from the second set of teeth of the first zipper when the case is positioned in the open configuration, and the first set of teeth of the first zipper is attached to the second set of teeth of the first zipper when the case is positioned in the closed configuration.

5. The case of claim 4, further comprising a second zipper, the second zipper including:
a first set of teeth coupled to and extending along an edge of the first flap; and
a second set of teeth coupled to and extending along an edge of the fourth flap, wherein the first set of teeth of the second zipper is separated from the second set of teeth of the second zipper when the case is positioned in the open configuration, and the first set of teeth of the second zipper is attached to the second set of teeth of the second zipper when the case is positioned in the closed configuration.

6. The case of claim 5, further comprising a third zipper, the third zipper including:
a first set of teeth coupled to and extending along an edge of the second flap; and
a second set of teeth coupled to and extending along an edge of the fourth flap, wherein the first set of teeth of the third zipper is separated from the second set of teeth of the third zipper when the case is positioned in the open configuration, and the first set of teeth of the third zipper is attached to the second set of teeth of the third zipper when the case is positioned in the closed configuration.

7. The case of claim 1, wherein the first flap includes a first fastening strip and the third flap includes a second fastening strip, the first fastening strip being attachable to the second fastening strip as a first hook and loop fastener when the case is positioned in the closed configuration.

8. The case of claim 1, wherein the case is further configured to be positioned in a vehicle loading configuration in which the first flap, the third flap, and the fourth flap respectively extend upwardly from the base, and in which the second flap extends downwardly from the base.

9. The case of claim 8, wherein the case is configured to be located in a trunk compartment of a vehicle when the case is positioned in the vehicle loading configuration.

10. The case of claim 9, wherein the base is configured to be positioned against an interior floor of the trunk compartment, the first flap is configured to be positioned against an interior seat back of the trunk compartment, the third flap is configured to be positioned against a first interior sidewall of the trunk compartment, and the fourth flap is configured to be positioned against a second interior sidewall of the trunk compartment.

11. The case of claim 1, wherein the first flap includes a first pocket and the fourth flap includes a second pocket.

12. The case of claim 1, wherein the base, the first flap, the second flap, the third flap, and the fourth flap are respectively constructed of a flexible material.

13. A case for a portable grill, the case comprising:
a base;
a first flap extending from the base, the first flap includes a first fastening strip, the first flap including a first fastening tab;
a second flap extending from the base;
a third flap extending from the base, the third flap including a second fastening strip; and
a fourth flap extending from the base, the fourth flap including a second fastening tab, wherein the case is configured to be positioned in an open configuration in which the first flap extends radially away from the base in a first direction, the second flap extends radially away from the base in a second direction that differs from the first direction, the third flap extends radially away from the base in a third direction that differs from the first and second directions, and the fourth flap extends radially away from the base in a fourth direction that differs from the first, second, and third directions, the base being centrally located relative to the first flap, the second flap, the third flap, and the fourth flap;
wherein the case is further configured to be positioned in a closed configuration in which the first flap, the second flap, the third flap, and the fourth flap respectively extend upwardly from the base, the first fastening strip being attachable to the second fastening strip as a first hook and loop fastener when the case is positioned in the closed configuration, and the first fastening tab being attachable to the second fastening tab as a second hook and loop fastener when the case is positioned in the closed configuration.

14. The case of claim 13, wherein the first flap includes a first fastening strap and the second flap includes a second fastening strap, the first fastening strap being attachable to the second fastening strap as a third hook and loop fastener when the case is positioned in the closed configuration.

15. A case for a portable grill, the case comprising:
a base;
a first flap extending from the base;
a second flap extending from the base;
a third flap extending from the base;
a fourth flap extending from the base, the base being centrally located relative to the first flap, the second flap, the third flap, and the fourth flap;
a first zipper to couple the first flap and the second flap;
a second zipper to couple the first flap and the fourth flap;
a third zipper to couple the second flap and the fourth flap; and
a hook and loop fastener to couple the fourth flap to respective ones of the first flap and the second flap.

16. The case of claim 15, wherein the case is configured to be positioned in an open configuration in which the first flap extends radially away from the base in a first direction, the second flap extends radially away from the base in a second direction that differs from the first direction, the third flap extends radially away from the base in a third direction that differs from the first and second directions, and the fourth flap extends radially away from the base in a fourth direction that differs from the first, second, and third directions, wherein the first direction is generally opposite the second direction, the third direction is generally opposite the fourth direction, and the first direction is generally orthogonal to the third direction, and wherein the case is further configured to be positioned in a closed configuration in which the first flap, the second flap, the third flap, and the fourth flap respectively extend upwardly from the base.

17. The case of claim 15, wherein the base, the first flap, the second flap, the third flap, and the fourth flap are respectively constructed of a flexible material.

18. The case of claim 15, wherein the case is further configured to be positioned in a vehicle loading configuration in which the first flap, the third flap, and the fourth flap respectively extend upwardly from the base, and in which the second flap extends downwardly from the base, wherein the case is configured to be located in a trunk compartment of a vehicle when the case is positioned in the vehicle loading configuration.

19. The case of claim 18, wherein the base is configured to be positioned against an interior floor of the trunk compartment, the first flap is configured to be positioned against an interior seat back of the trunk compartment, the third flap is configured to be positioned against a first interior sidewall of the trunk compartment, and the fourth flap is configured to be positioned against a second interior sidewall of the trunk compartment.

20. The case of claim 15, wherein the first flap and the fourth flap define a first opening and the second flap and the fourth flap define a second opening when the fourth flap is coupled to the first flap and the second flap when the case is configured in a closed configuration.

* * * * *